US006965601B1

(12) United States Patent
Nakano et al.

(10) Patent No.: US 6,965,601 B1
(45) Date of Patent: Nov. 15, 2005

(54) DATA TRANSMITTING METHOD AND DATA TRANSMITTER

(75) Inventors: Hiroshi Nakano, Kanagawa (JP); James Hedley Wilkinson, Basingstoke (GB)

(73) Assignees: Sony Corporation, Tokyo (JP); Sony United Kingdom Limited, Basingstoke (GB)

( * ) Notice: Subject to any disclaimer, the term of this patent is extended or adjusted under 35 U.S.C. 154(b) by 0 days.

(21) Appl. No.: 09/719,672

(22) PCT Filed: Apr. 16, 1999

(86) PCT No.: PCT/JP99/02040

§ 371 (c)(1), (2), (4) Date: Mar. 13, 2001

(87) PCT Pub. No.: WO00/64160

PCT Pub. Date: Oct. 26, 2000

(51) Int. Cl.[7] .................................... H04Q 7/00
(52) U.S. Cl. .................... 370/394; 370/473; 348/461
(58) Field of Search ............................ 370/394, 473; 348/461, 462, 484

(56) References Cited

U.S. PATENT DOCUMENTS 5,675,388 A * 10/1997 Cooper ....................... 348/461
5,929,921 A * 7/1999 Taniguchi et al. .......... 348/484
6,493,357 B1 * 12/2002 Fujisaki ...................... 370/474
6,690,428 B1 * 2/2004 Hudelson et al. ........... 348/461

FOREIGN PATENT DOCUMENTS

JP 8-298508 11/1996

OTHER PUBLICATIONS

Yoshio Kamiura, "Packet densou SDTI (Serial Data Transport Interface)" Eizou Jouhou Media Gakkaishi, vol. 51, No. 11, pp. 1826 to 1834 (Tokyo) 1997.

* cited by examiner

*Primary Examiner*—Ricky Ngo
*Assistant Examiner*—Richard Chang
(74) *Attorney, Agent, or Firm*—Frommer Lawrence & Haug LLP; William S. Frommer; Samuel S. Lee

(57) ABSTRACT

When a serial digital transfer interface transmission packet in which an interval of each line of a video frame comprises an area into which an end synchronizing code EAV is inserted, an area into which header data is inserted, an area into which a start synchronizing code SAV is inserted and a payload area into which data containing video data and/or audio data is inserted is transmitted, a transmission packet is generated by inserting frame sequence data for managing the phase of the audio data into the payload area at its audio item portion of a header area corresponding to an audio data block area into which the audio data is inserted and transmitted in the form of serial data. Also, a transmission packet is generated by inserting not only the frame sequence data but also data indicative of the number of audio samples contained in a frame indicated by the frame sequence data into an audio sample count area corresponding to the audio data block area and transmitted.

6 Claims, 18 Drawing Sheets

F I G. 3
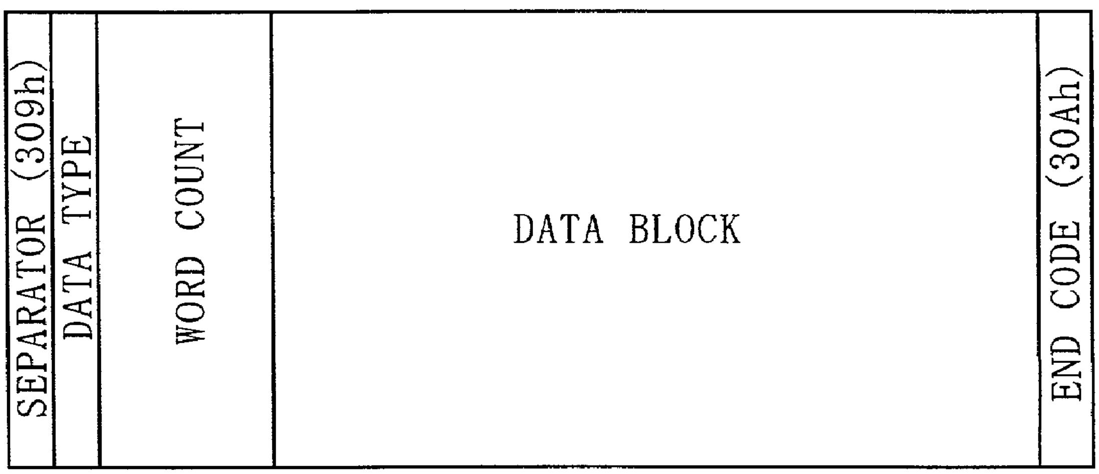

F I G . 5
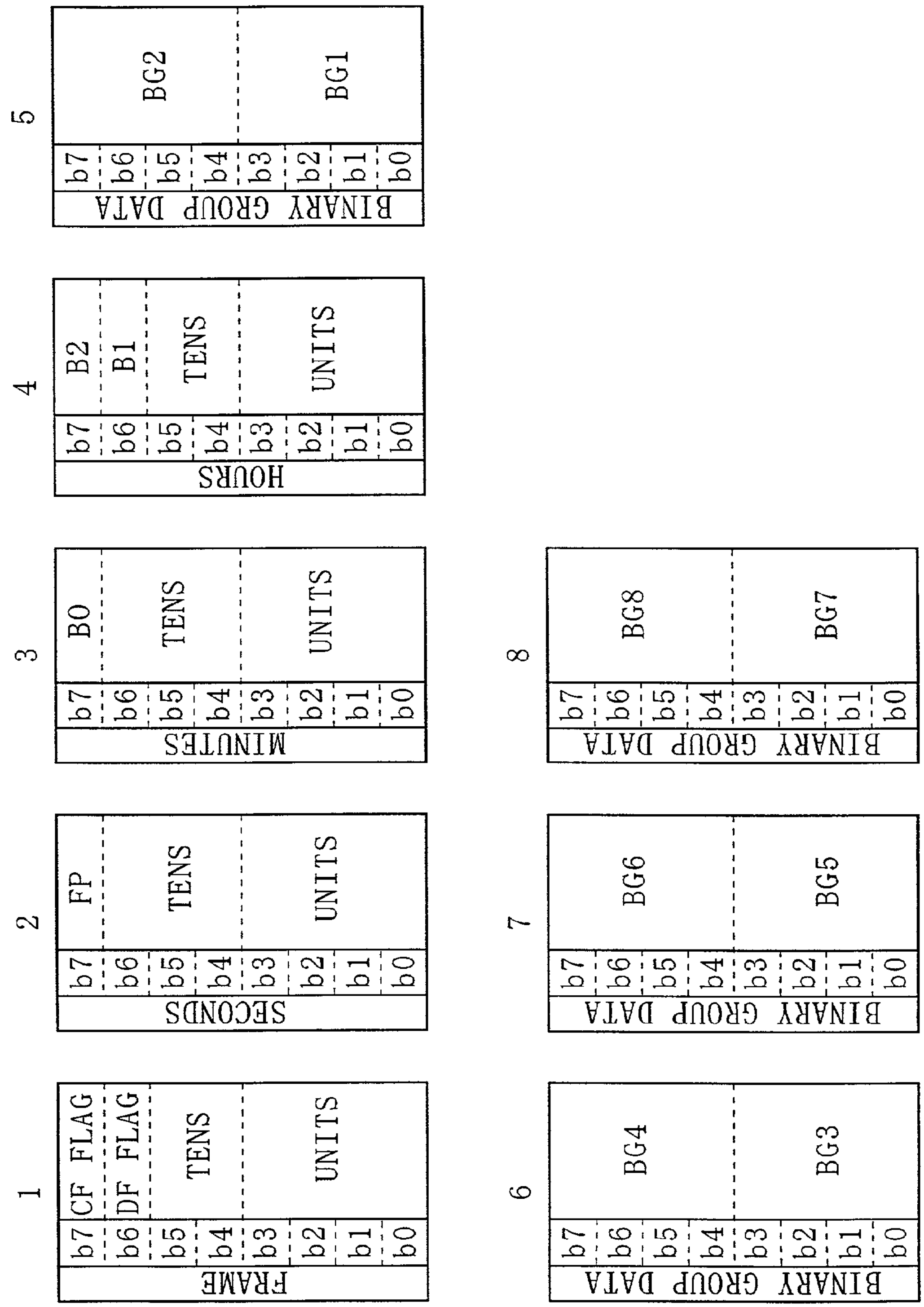

F I G. 7
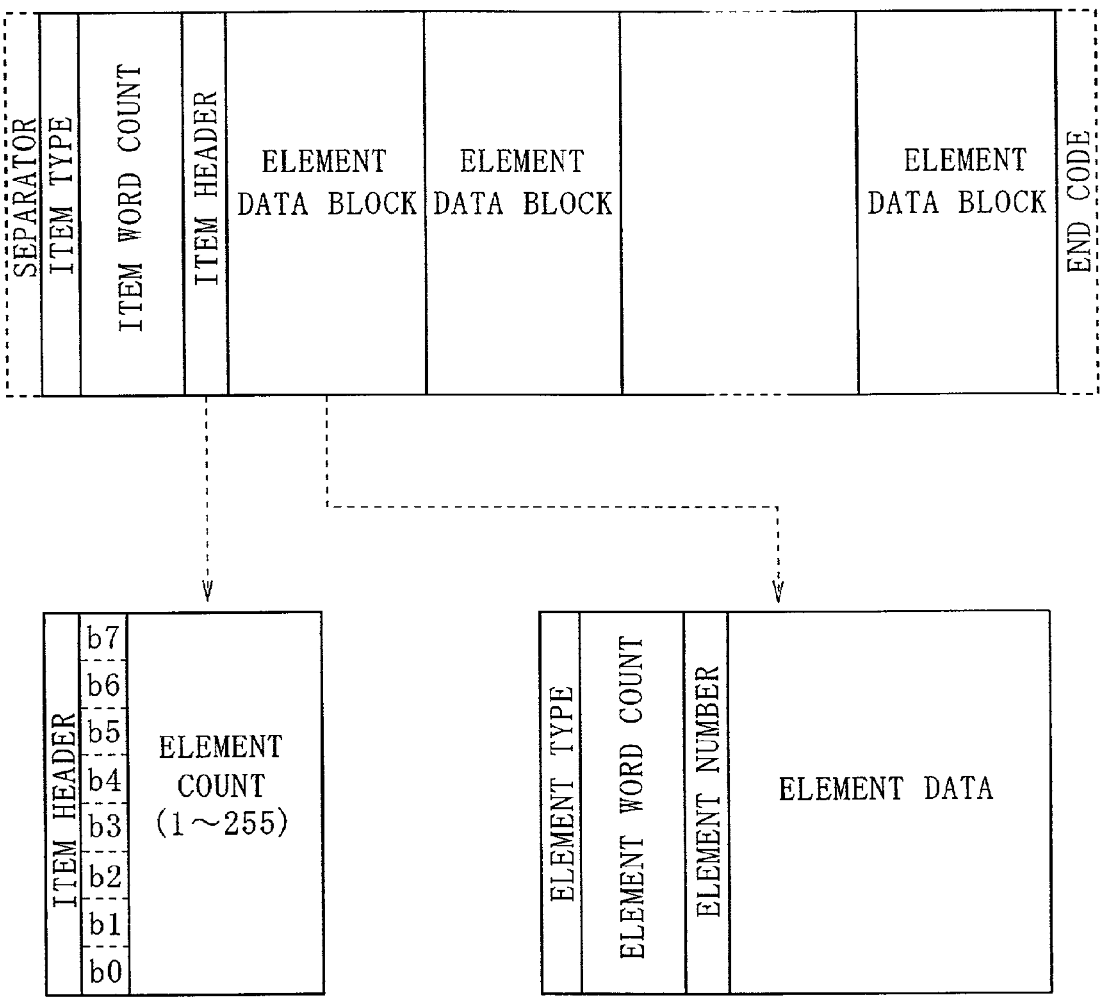

FIG. 9

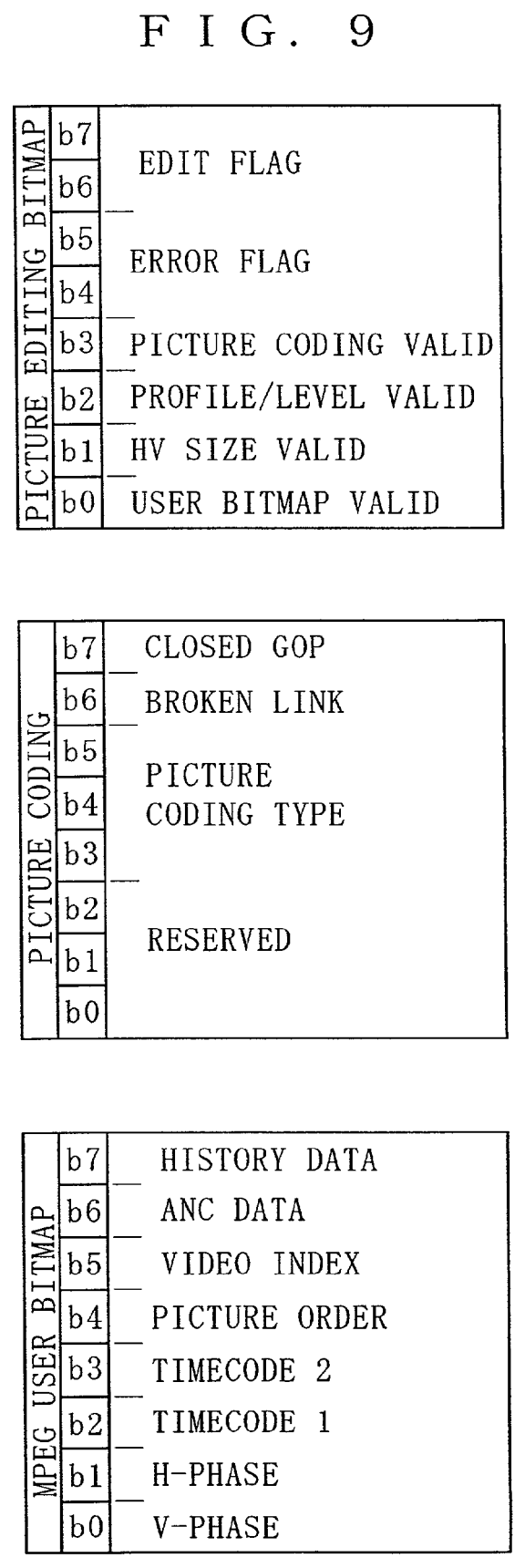

| PICTURE EDITING BITMAP | | |
|---|---|---|
| | b7 | EDIT FLAG |
| | b6 | |
| | b5 | ERROR FLAG |
| | b4 | |
| | b3 | PICTURE CODING VALID |
| | b2 | PROFILE/LEVEL VALID |
| | b1 | HV SIZE VALID |
| | b0 | USER BITMAP VALID |

| PICTURE CODING | | |
|---|---|---|
| | b7 | CLOSED GOP |
| | b6 | BROKEN LINK |
| | b5 | PICTURE CODING TYPE |
| | b4 | |
| | b3 | |
| | b2 | RESERVED |
| | b1 | |
| | b0 | |

| MPEG USER BITMAP | | |
|---|---|---|
| | b7 | HISTORY DATA |
| | b6 | ANC DATA |
| | b5 | VIDEO INDEX |
| | b4 | PICTURE ORDER |
| | b3 | TIMECODE 2 |
| | b2 | TIMECODE 1 |
| | b1 | H-PHASE |
| | b0 | V-PHASE |

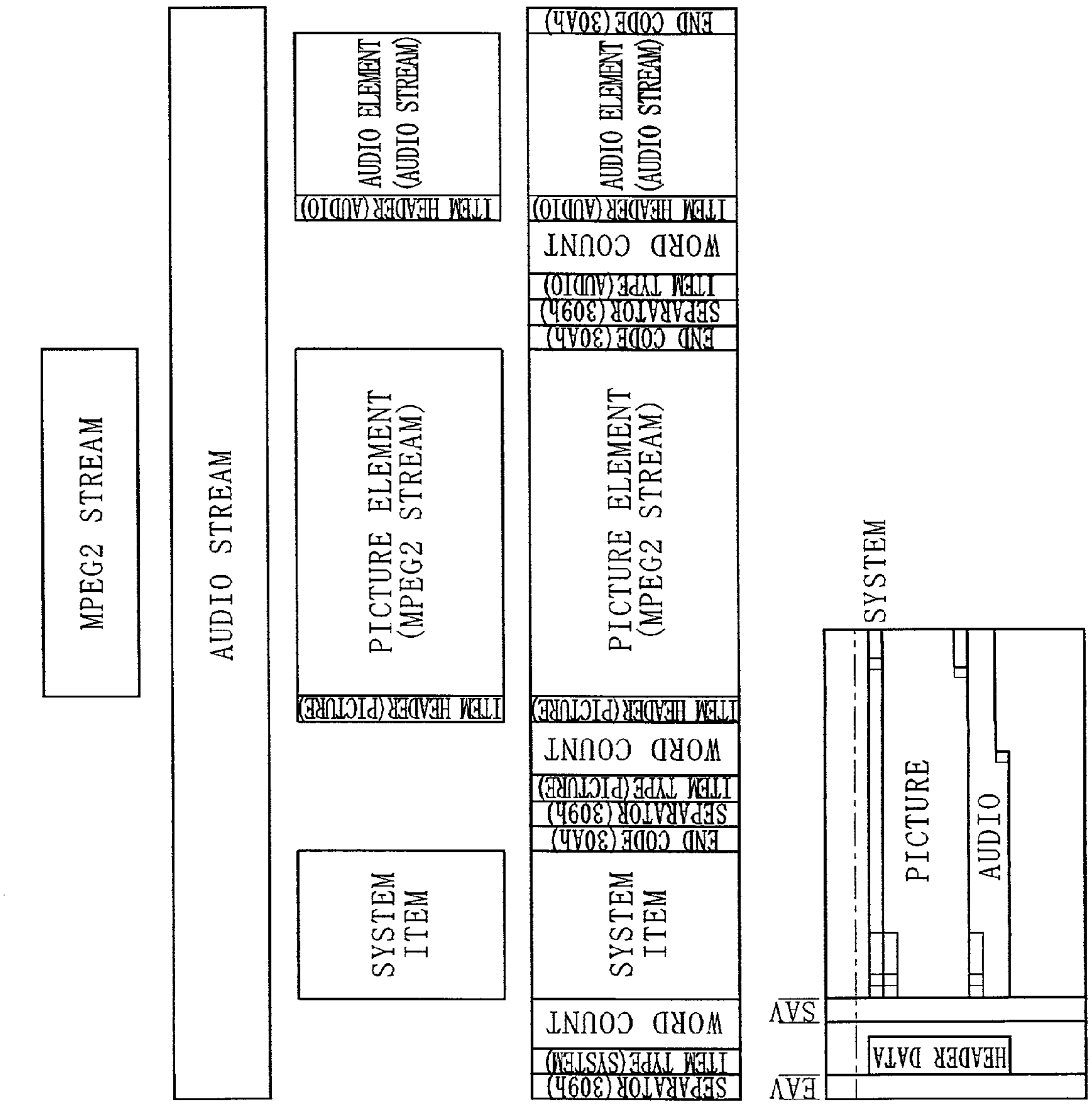
FIG. 15A (DVC)
FIG. 15B (DAU)
FIG. 15C (CPA)
FIG. 15D (CPB)
FIG. 15E (CPC)

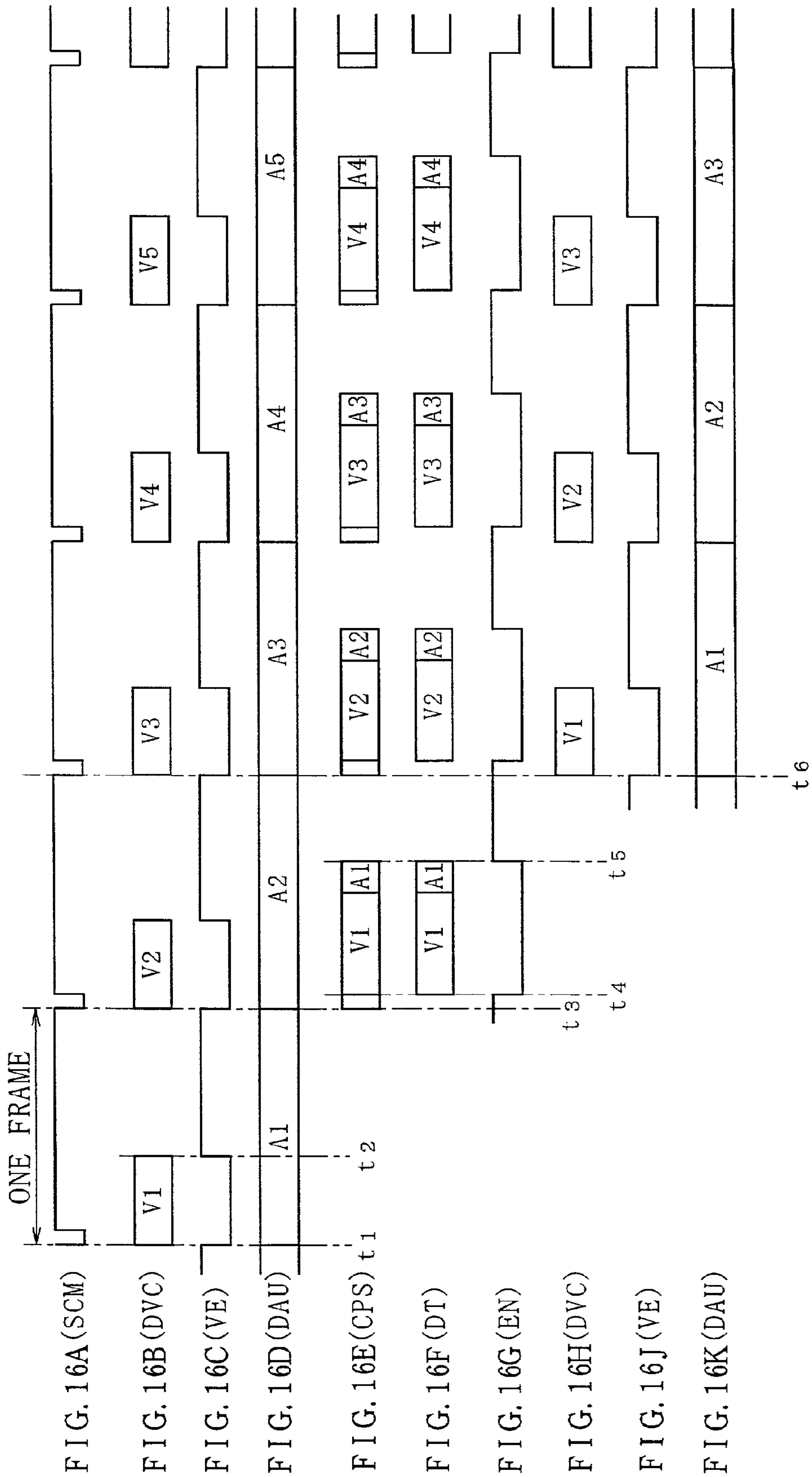
FIG. 16A (SCM)
FIG. 16B (DVC)
FIG. 16C (VE)
FIG. 16D (DAU)
FIG. 16E (CPS)
FIG. 16F (DT)
FIG. 16G (EN)
FIG. 16H (DVC)
FIG. 16J (VE)
FIG. 16K (DAU)

FRAME SIGNAL

REFERENCE SEQUENCE

FRAME SEQUENCE OBTAINED AFTER SWITCHING

FRAME SEQUENCE OBTAINED AFTER SWITCHING
5 FRAMES=8008 SAMPLES
1602
1601
1602
1601
1602
1
2
3
4
5
1
1
1
1
1
4
4
4
4
4

DATA TRANSMITTING METHOD AND DATA TRANSMITTER

TECHNICAL FIELD

This invention relates to a data transmission method and a data transmission apparatus.

BACKGROUND ART

Heretofore, the SMPTE (Society of Motion Picture and Television Engineers: Society of Motion Picture and Television Engineers) and the EBU (European Broadcasting Union: European Broadcasting Union) have examined the exchange of programs between broadcasting stations, and have then announced "EBU/SMPTE Task Force for Harmonized Standards for the Exchange of Programme Material as Bit streams" as the results of such examination.

In this announcement, essential data of a program, e.g. video and audio materials may be set to essence data (Essence), and contents of essence data, e.g. information such as a program title or a video system (NTSC or PAL) and an audio sampling frequency may be set to metadata (Metadata).

Next, essence data and metadata may constitute a content element (Content Element). Further, video and content items (Content Item) may be generated by using a plurality of content elements. For example, a video clip which may be useful as an index of images may be equivalent to this content item. Also, a plurality of content items and a plurality of content elements may constitute a content package (Content Package). This content package may be equivalent to one program, and a set of content packages is what might be called a wrapper (Wrapper). It has been proposed to make the program exchange become easy by standardizing means for transmitting this wrapper and means for accumulating this wrapper between the broadcasting stations.

The above-mentioned announcement has described only the concept of the program exchange, and has not yet concretely determined the manner in which a program can be transmitted. For this reason, the program could not be transmitted as the content package in actual practice in the above-mentioned manner.

Therefore, it is an object of this invention to provide a digital data transmission method in which a program can be transmitted in the form of a content package and a program transmission apparatus using such digital transmission method.

DISCLOSURE OF INVENTION

A data transmission method according to this invention is a data transmission method for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted. This data transmission method comprises a first step of generating a transmission packet by inserting frame sequence data for managing the phase of the audio data into the payload area at its header area corresponding to an audio data block area into which audio data is inserted and a second step of transmitting the transmission packet into which the frame sequence data was inserted at the first step in the form of serial data. Also, the data transmission method comprises a first step of generating a transmission packet by inserting frame sequence data for managing the phase of the audio data into the payload area at its header area corresponding to an audio data block area into which audio data is inserted and by inserting data indicative of the number of audio samples contained in a frame indicated by frame sequence data into an audio sample count area corresponding to the audio data block area and a second step of transmitting the transmission packet into which the frame sequence data and the data indicative of the number of audio samples were inserted at the first step in the form of serial data.

Further, a data transmission apparatus according to this invention is a data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted. This data transmission apparatus comprises a data insertion means for inserting frame sequence data for managing the phase of the audio data into the payload area at its header area corresponding to an audio data block area into which audio data is inserted and a data output means for outputting the transmission packet into which the frame sequence data was inserted by the data insertion means in the form of serial data. Also, this transmission apparatus comprises a data insertion means for inserting frame sequence data for managing the phase of the audio data into the payload area at its header area corresponding to an audio data block area into which audio data is inserted and inserting data indicative of the number of audio samples contained in a frame indicated by the frame sequence data into an audio sample count area corresponding to the audio data block area and a data output means for outputting the transmission packet into which the frame sequence data and the data indicative of the number of audio samples were inserted by the data insertion means in the form of serial data.

According to this invention, when a serial digital transfer interface transmission packet in which an interval of each line of a video frame comprises an area into which an end synchronizing code EAV, for example, is inserted, an area into which header data is inserted, an area into which a start synchronizing code SAV is inserted and a payload area into which data containing video data and/or audio data is inserted is transmitted, a transmission packet is generated by inserting frame sequence data such as 5-frame sequence or the like for managing the phase of audio data into the payload area at its audio item portion of a header area corresponding to an audio data block area into which audio data is inserted. Also, not only the frame sequence data but also data indicative of the number of audio samples contained in a frame indicated by frame sequence data is inserted into an audio sample count area corresponding to the audio data block area.

BRIEF DESCRIPTION OF DRAWINGS

FIG. 3 is a diagram showing a format of a variable-length block.

FIG. 5 is a diagram showing an arrangement of a time code.

FIG. 7 is a diagram showing an arrangement of other item than the system item.

FIG. 9 is a diagram showing an arrangement of MPEG-2 picture editing metadata.

FIGS. 15A to 15E are diagrams to which reference will be made in explaining an operation of the CP encoder.

FIGS. 16A to 16K are diagrams to which reference will be made in explaining a data transmission operation.

BEST MODE FOR CARRYING OUT THE INVENTION

This invention will hereinafter be described in detail with reference to the drawings. In this invention, respective content items (e.g. picture item (Picture Item) and audio item (Audio Item) may be generated by packaging data such as video and audio materials, and one content item (system item (System Item)) may be generated by packaging information concerning each content item and metadata concerning each content or the like. These respective content items may be used as content packages. Further, a transmission packet may be generated from this content package, and may be transmitted by using a serial digital transfer interface.

The above-mentioned content package may be transmitted by using a digital signal serial transmission format of SMPTE-259M "10-bit 4:2:2 Component and 4fsc Composite Digital Signals-Serial Digital Interface" (hereinafter referred to as "serial digital interface SDI (Serial Digital Interface) format") standardized by the SMPTE, for example, or the standard SMPTE-305M "Serial Data Transport Interface" (hereinafter referred to as "SDTI format") for transmitting a digital signal, which was assembled into packets, as this serial digital transfer interface.

Initially, when the SDI format standardized by the SMPTE-259M may be located in the video frame, the NTSC525 system digital video signal may comprise 1716 (4+268+4+1440) words per line in the horizontal direction and 525 lines in the vertical direction. Also, the PAL625 system digital video signal may comprise 1728 (4+280+4+1440) words per line in the horizontal direction and 625 lines in the vertical direction where 10 bits/word should be satisfied.

With respect to each line, 4 words ranging from the first word to the fourth word may indicate the end of a 1440-word active video area which may be a video signal area, and may be used as an area in which there may be stored a code EAV (End of Active Video) for separating the active video area and an ancillary data area which will be described later on.

With respect to each line, 268 words ranging from the fifth word to the 272th word may be used as the ancillary data area in which there may be stored header information, or the like. Four words ranging from the 273th word to the 276th word may indicate the start of the active video area and may be used as an area in which there may be stored a code SAV (Start of Active Video) for separating the active video area and the ancillary data area. Words following the 277th word may be used as the active video area.

According to the SDTI format, the above-mentioned active video area may be used a payload area, and the codes EAV and SAV may indicate the end and the start of the payload area.

Figure 1:
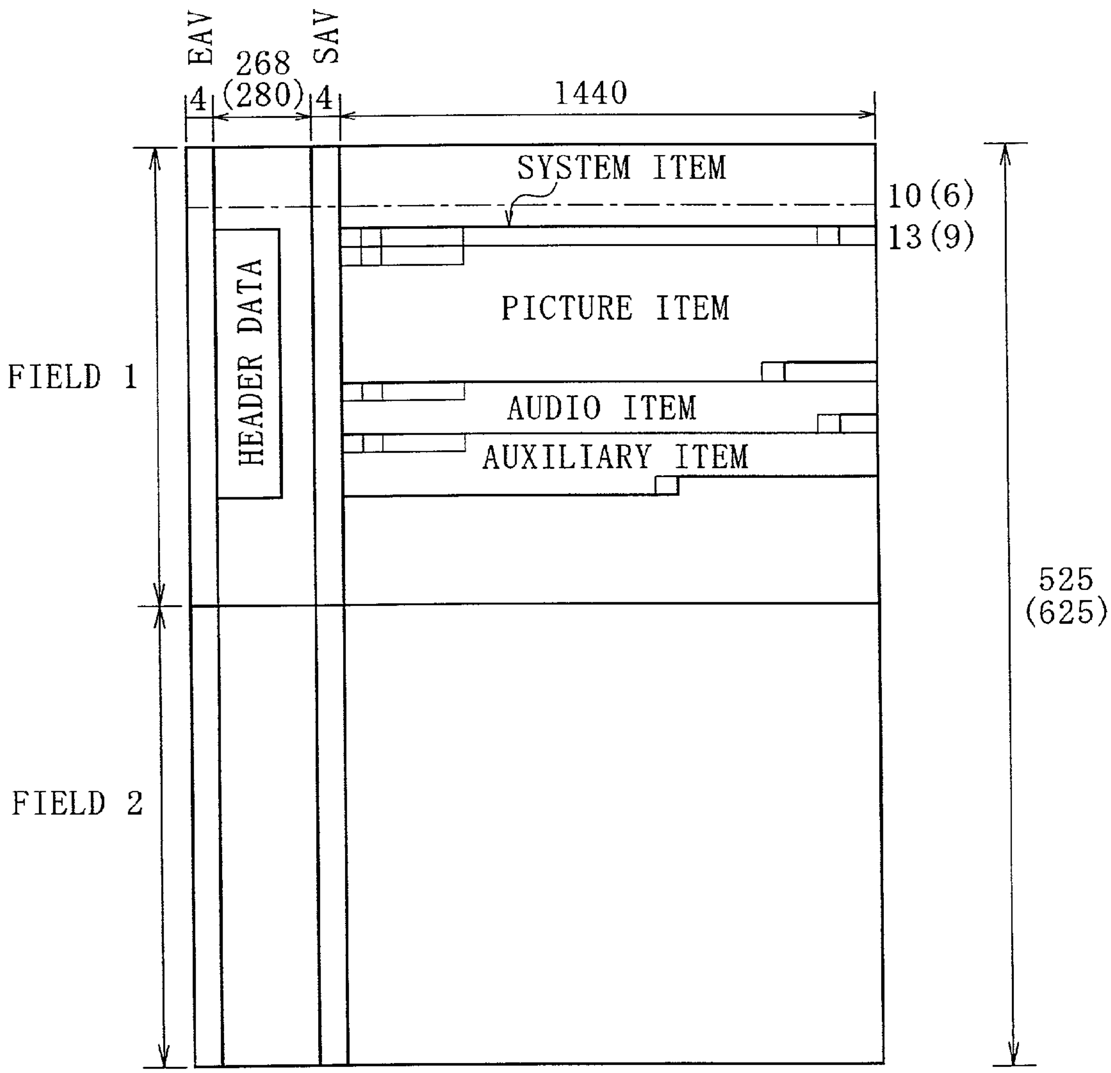
FIG. 1 is a diagram to which reference will be made in explaining the SDTI-CP format.

Here, data of each item may be inserted into the payload area of the SDTI format as the content package and the codes EAV and SAV of the SDI format may be added to the above-mentioned data thereby to form data of the format shown in FIG. 1. When data of the format shown in FIG. 1 (hereinafter referred to as "SDTI-CP format") is transmitted, similarly to the SDI format and the SDTI format, such data is P/S-converted and encoded in transmission line, thereby being transmitted as serial data. Incidentally, numerals within parentheses may indicate numerical values of the PAL625 system video signal, and numerals without parentheses may indicate numerical values of the NTSC525 system video signal. Only the NTSC system will be described below.

Figure 2:
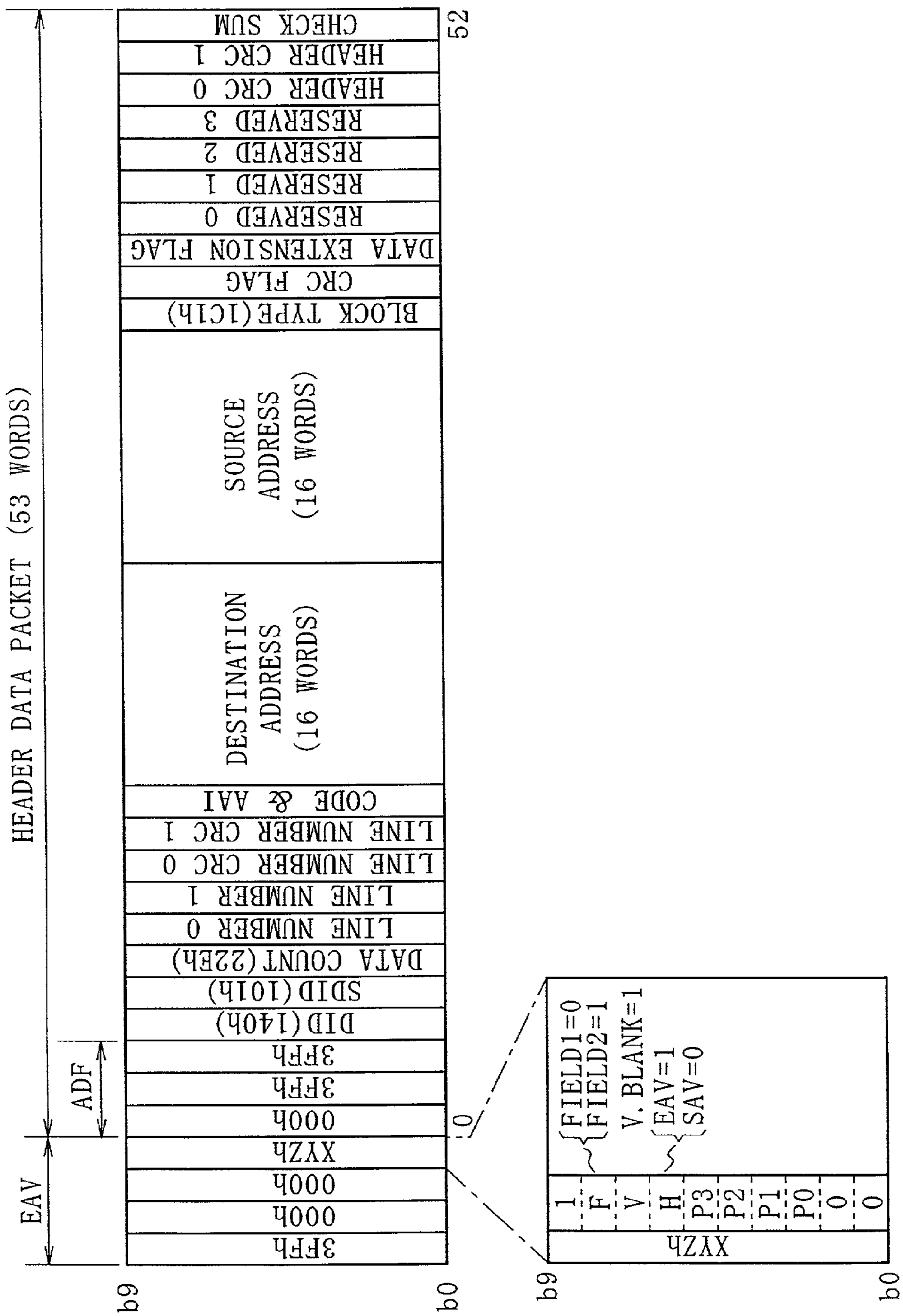
FIG. 2 is a diagram showing a format of a code EAV and header data.

FIG. 2 shows the arrangement of the code EAV and the header data (Header Data) contained in the ancillary data area.

The code EAV may be 3FFh, 000h, 000h, XYZh (h may express the hexadecimal notation, and this will apply for the following description as well).

In "XYZh", a bit b9 may be set to "1", and bits b0, b1 may be set to "0". A bit b8 may be a flag indicative of whether the field is the first field or the second field. A bit b7 may be a flag indicative of the vertical blanking period. Also, a bit b6 may be a flag indicative of whether the 4-word data is EAV or SAV. The flag of this bit b6 may be held to "1" when the 4-word data is EAV, and may be held to "0" when the 4-word data is SAV. Also, bits b5 to b2 may be data which are used to detect and correct errors. Next, at the leading portion of the header data, there may be located fixed patterns 000h, 3FFH, 3FFh as header data recognition data "ADF (Ancillary data flag)". The fixed pattern may be followed by "DID (Data ID)" and "SDID (Secondary data ID)" indicative of an attribute of the ancillary data area and in which there may be located fixed patterns 140h, 101h which may indicate that the attribute is a user application.

"Data Count" may indicate the number of words ranging from "Line Number-0" to "Header CRC1". The number of words may be set to 46 words (22Eh).

"Line Number-0, Line Number-1" may indicate the line numbers of the video frame. In the NTSC525 system, the 2 words may represent the line numbers ranging from 1 to 525. Also, in the PAL system 625 system, such 2 words may represent the line numbers ranging from 1 to 625.

"Line Number-0, Line Number-1" may be followed by "Line Number CRC0, Line Number CRC1". The "Line Number CRC0, Line Number CRC1" may be CRC (cyclic redundancy check codes) for the 5-word data ranging from "DID" to "Line Number-1", and may be used to check a transmission error.

"Code & AAI (Authorized address identifier)" may indicate information such as the word length of the payload area from the SAV to the EAV and the type of the data format of addresses of the transmission side and the reception side.

"Destination Address" may be address of the data reception side (destination), and "Source Address" may be address of the data transmission side (source).

"Block Type" which may follow the "Source Address" may indicate the type of the payload area, e.g. whether the payload area is of the fixed-length type or the variable-length type. When the payload area is of the variable-length type, compressed data may be inserted into the block type. Here, according to the SDTI-CP format, the variable-length block (Variable Block) may be used because a data quantity becomes different at every picture when the content item is generated by using compressed video data (video data), for example. Therefore, "Block Type" of the SDTI-CP format may be set to fixed data 1C1h.

"CRC Flag" may be a flag indicative of whether or not CRC is located at the last 2 words of the payload area.

Also, "Data extension flag" which may follow "CRC Flag" may be a flag indicative of whether or not a user data packet is extended.

The "Data extension flag" may be followed by a 4-word "Reserved" area. The next "Header CRC 0, Header CRC 1" may be CRC (cyclic redundancy check codes) for data ranging from "Code & AAI" to "Reserved4", and may be used to check a transmission error. The next "Check Sum" may be a Check Sum code for all header data, and may be used to check a transmission error.

Also, in the payload area of FIG. 1, item data such as video and audio may be packaged as the type of the variable-length block of the SDTI format. FIG. 3 shows a variable-length block format. "Separator" and "End Code" may represent the start and the end of the variable-length block. A value of "Separator" may be set to "309h" and a value of "End Code" may be set to "30Ah".

"Data Type" may indicate the type of the packaged data, such as the type of item data. A value of "Data Type" may be set to "04h" when the packaged data is a system item (System Item), may be set to "05h" when the packaged data is a picture item (Picture Item), may be set to "06h" when the packaged data is an audio item (Audio Item), and may be set to "07h" when the packaged data is an AUX item (Auxiliary Item). Incidentally, when one word is formed of 10 bits as described above and may be formed of 8 bits as shown by "04h", for example, 8 bits may be equivalent to bits b7 to b0. Also, one word may become data of 10 bits by adding an even parity of bits b7 to b0 as a bit b8 and by adding logically-inverted data of bit b8 as a bit b9. Data of 8 bits in the following description may be formed into data of 10 bits in the similar manner.

"Word Count" may indicate the number of words of "Data Block", and this "Data Block" may be data of each item. Here, since data of each item may be packaged at the picture unit, for example, at the frame unit and the program switching position may be set to the position of 10 lines according to the NTSC system, data will be transmitted from the 13th line in the sequential order of the system item, the picture item, the audio item and the AUX item according to the NTSC system as shown in FIG. 1.

Figure 4:
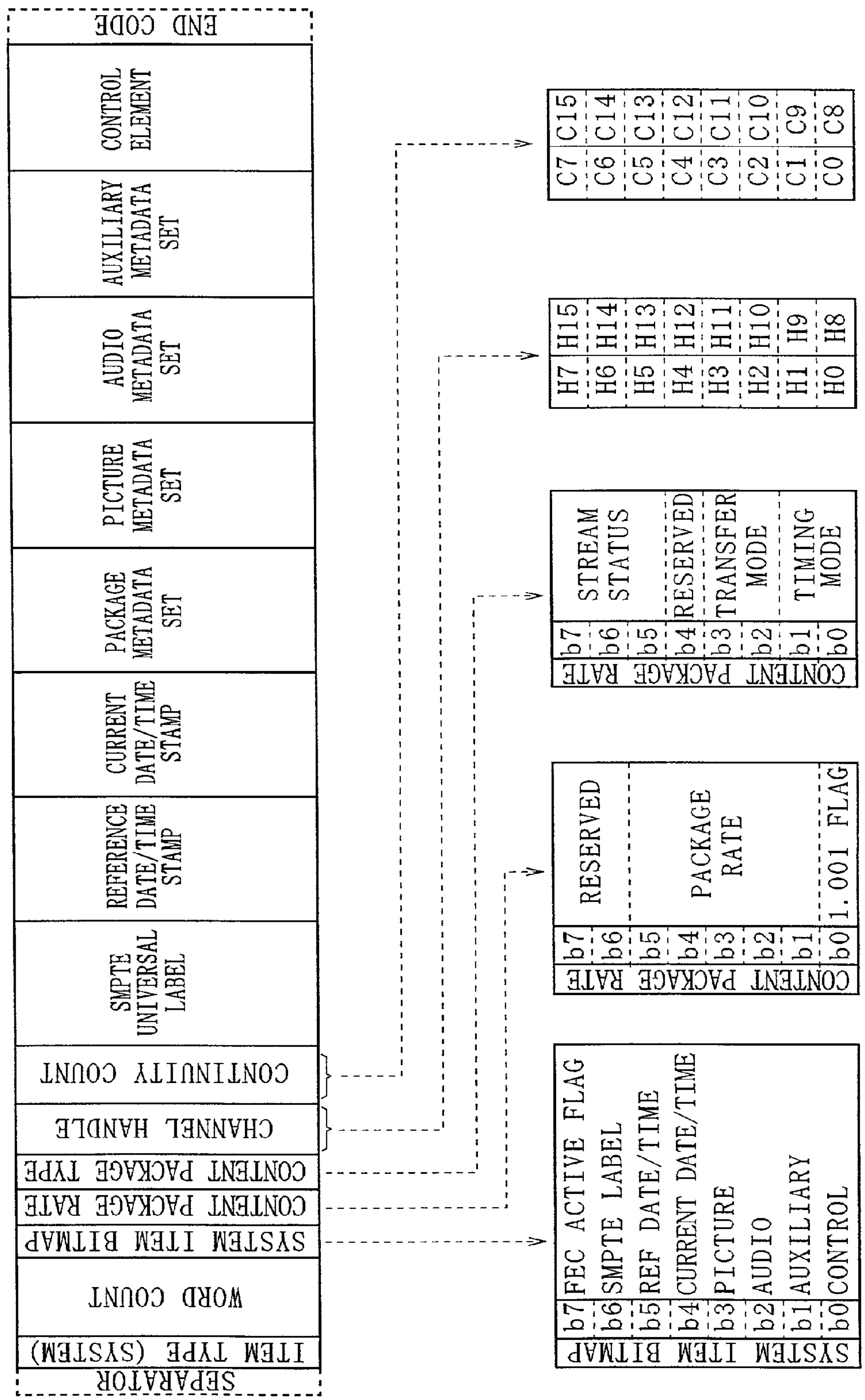
FIG. 4 is a diagram showing an arrangement of a system item.

FIG. 4 shows the arrangement of the system item. "System Item Type" and "Word Count" may be equivalent to "Data Type" and "Word Count" of the variable-length block.

A bit b7 of "System Item Bitmap" of one word may be a flag indicating whether or not an error-detection and error-detection code such as Reed Solomon code is added to the data. If such flag is held at "1", then there may be indicated that the error-detection and error-correction code is added to the data. A bit b6 may be a flag indicating whether or not information of SMPTE Label is contained in the system item. If such flag is held at "1", then there may be indicated that the information of SMPTE Label may be contained in the system item. Bits b5 and b4 may be a flag indicating whether or not the system item contains Reference Date/Time stamp and Current Date/Time stamp. The Reference Date/Time stamp may indicate a time or a date at which the content package, for example, was created first. Also, the Current Date/Time stamp may indicate a time or a date at which data of the content package was corrected last.

A bit b3 may be a flag indicating whether or not the picture item follows the system item, a bit b2 may be a flag indicating whether or not the audio item follows the system item, and a bit b1 may be a flag indicating whether or not the AUX item follows the system item. If these flags are held at "1", then there may be indicated that the above-mentioned respective items may be located behind the system item.

A bit b0 may be a flag indicating whether or not there may exist a control element (Control Element). If the above-mentioned flag is held at "1", then it may be indicated that there may exist the control element. Incidentally, although not shown, bits b8, b9 may be added to the data as described above, and the resultant data may be transmitted in the form of 10-bit data.

Bits b7 to b6 of "Count Package Rate" of one word may be used as a reserved area (Reserved). Bits b5 to b1 may indicate a package rate (Package Rate) which may be the number of packages per second in the one-time normal speed operation mode. A bit b0 may be 1.001 flag. If this flag is held at "1", then it may be indicated that package rate is (1/1.001) times the normal speed.

The bits b7 to b5 of "Content Package Type" of one word may be a "Stream States" flag which may be used to discriminate the positions of the picture unit within the stream. This 3-bit flag may indicate the following 8 kinds of the states.

0: This picture unit does not belong to any one of the pre-roll (pre-roll) interval, the editing interval and the post-roll (post-roll) interval.

1: This picture unit is the picture contained in the pre-roll interval and which is followed by the editing interval.

2: This picture unit is the first picture unit of the editing interval.

3: This picture unit is the picture unit contained in the intermediate portion of the editing interval.

4. This picture unit is the last picture unit of the editing interval.

5. This picture unit is the picture unit contained in the post-roll interval.

6. This picture unit is the first and last picture unit of the editing interval (state in which the editing interval has only one picture unit).

7. Reserved.

The bit b4 may be the reserved area (Reserved), and "Transfer Mode" of bits b3, b2 may indicate the transmission mode of the transmission packet. "Timing Mode" of the bits b1, b0 may indicate the transmission timing mode required when the transmission packet is transmitted. Here, if the value represented by the bits b3, b2 is held at "0", then it may be indicated that the transmission timing mode may be a synchronous mode (Synchronous mode). If such value is held at "1", then it may be indicated that the transmission timing mode may be an isochronous mode (Isochronous mode). If such value is "2", then it may be indicated that the transmission timing mode may be an asynchronous mode (Asynchronous mode). Also, if the value represented by the bits b1, b0 is held at "0", then it may be indicated that the transmission timing mode is a normal timing mode (Normal timing mode) in which the transmission of the content package of one frame may be started at a timing of a predetermined line of the first field. If such value is held at "1", then it may be indicated that the transmission timing mode is an advanced timing mode (Advanced timing mode) in which the transmission may be started at a timing of a predetermined line of the second field. If such value is held at "2", then it may be indicated that the transmission timing mode is a dual timing mode (Dual timing mode) in which the transmission may be started at a timing of predetermined lines of the first and second fields.

"Channel Handle" of 2 words following "Content Package Type" may be used to discriminate the content package of each program when content packages of a plurality of programs are multiplexed and then transmitted. It is possible to separate the multiplexed content package at every program by discriminating the values of bits H15 to H0.

"Continuity Count" of 2 words may be a 16-bit modulo counter. This counter may count the value at every picture unit in an ascending order, and may independently count the value in each stream. Accordingly, when the stream is switched by a stream switcher or the like, the value of this counter may become discontinuous, thereby making it possible to detect a switching point (editing point). Incidentally, since this counter may be the 16-bit modulo counter as described above and the count value thereof may be a very large value as 65536, there is then the probability lowest as possible that the values of the counter will accidentally agree with each other at the switching point. Therefore, it is possible to provide a sufficiently high accuracy for detecting the switching point in actual practice.

"Continuity Count" may be followed by "SMPTE Universal Label", "Reference Date/Time stamp", "Current Date/Time stamp" which may indicate the above-mentioned SMPTE Label, Reference Date/Time and Current Date/Time.

There may be provided the following "Package Metadata Set", "Picture Metadata Set", "Audio Metadata Set", "Auxiliary Metadata Set". Incidentally, "Picture Metadata Set", "Audio Metadata Set", "Auxiliary Metadata Set" may be provided when it may be indicated by the flag of "System Item Bitmap" that the corresponding item may be contained in the content package.

17 bytes may be allocated to the above-mentioned "Time stamp". The first 1 byte may be used to discriminate "Time stamp", and the remaining 16 bytes may be used as the data area. The first 8 bytes of the data area may indicate a time code (Time code) standardized as an SMPTE12M, for example, and the following 8 bytes may be used as invalid data.

The 8-byte time code may comprise "Frame", "Seconds", "Minutes", "Hours" and "Binary Group data" of 4 bytes as shown in FIG. 5.

Bits b5, b4 of the "Frame" may represent the second digit of the frame number, and bits b3 to b0 may represent the first digit of the frame number. Similarly, bits b6 to b0 of the "Seconds", the "Minutes", the "Hours" may represent the second, the minute and the hour.

A bit b7 of the "Frame" may be a color frame flag (Color Frame Flag), and may represent whether the color frame is the first color frame or the second color frame. A bit b6 may be a drop frame flag (Drop Frame Flag), and this flag may represent whether or not the video frame inserted into the picture item may be the drop frame. A bit b7 of the "Seconds" may represent whether the phase is the field phase (Field Phase), i.e. the first field or the second field in the case of the NTSC system, for example. Incidentally, in the case of the PAL system, a bit b6 of the "Hours" may represent the field phase.

A bit b7 of the "Minutes" and 3 bits B0 to B3 of bits b7, b6 of the "Hours" (3 bits of respective bits b7 of the "Seconds", the "Minutes", the "Hours" in the case of the PAL system) may indicate whether or not respective BG1 to BG8 of "Binary Group Data" may contain data. This "Binary Group Data" may be able to represent a date of Gregorian Calendar (Gregorian Calender) and a date of Julian Calendar (Julian Calender), for example, in the form of two digits.

Figure 6:
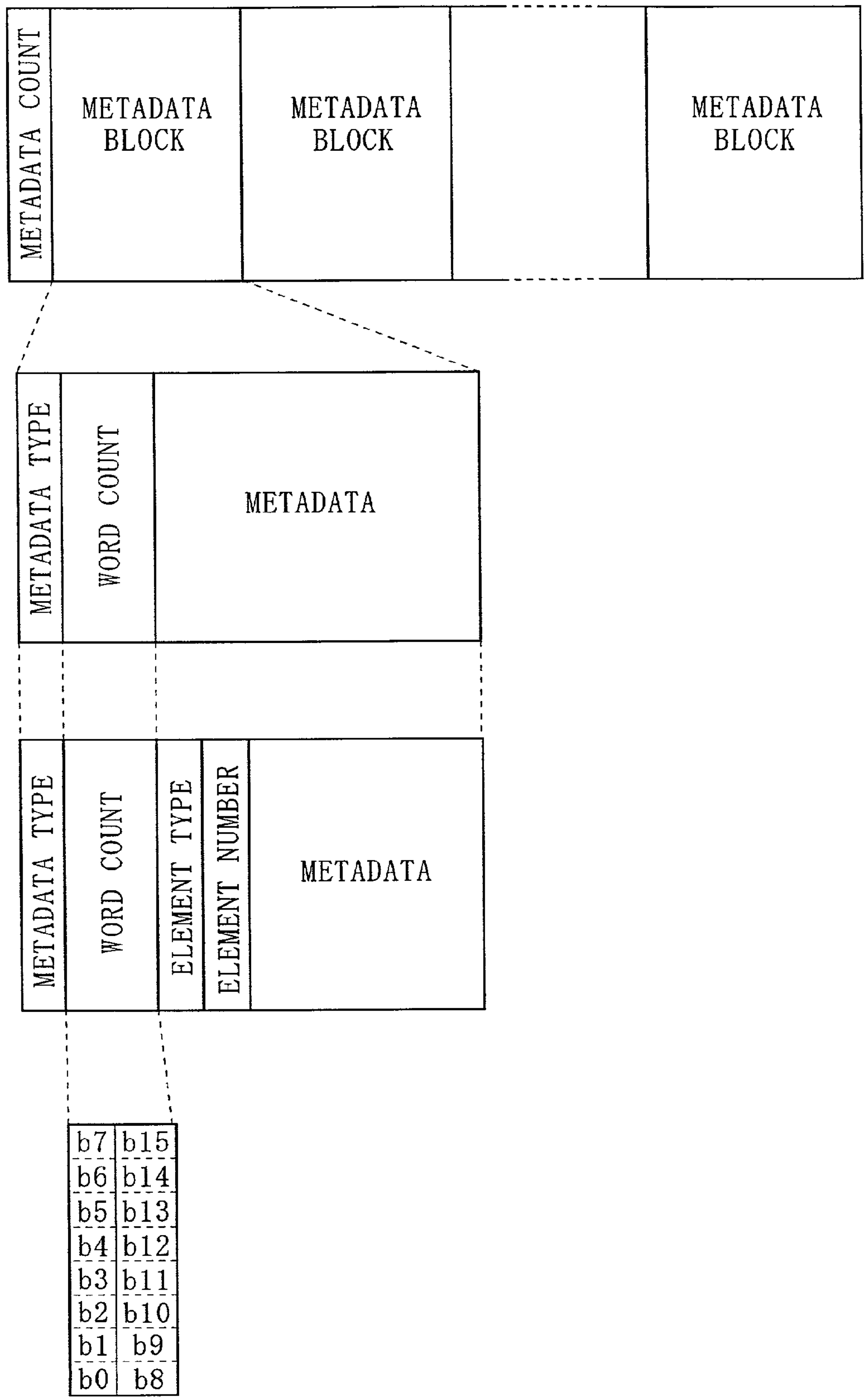
FIG. 6 is a diagram showing an arrangement of a metadata set.

FIG. 6 shows the arrangement of "Metadata Set". "Metadata Count" of one word may indicate the number of "Metadata Block" provided within the set. Incidentally, when the value of "Metadata set" is held at 00h, there may be indicated the absence of "Metadata Block" so that "Metadata Set" may become one word.

When "Metadata Block" is "Package Metadata Set" indicative of content package information such as a program title, "Metadata Type" of one word and "Word Count" of 2 words may be followed by "Metadata" serving as an information area. The number of words of this "Metadata" may be represented by bits b15 to b0 of "Word Count".

"Picture Metadata Set", "Audio Metadata Set", "Auxiliary Metadata Set" representing information concerning packaged items such as video data or audio data or AUX data may further include "Element Type" and "Element Number" of one word which may be linked to "Element Type" and "Element Number" provided within "Element Data Block" of items such as video item or audio item, which will be described later on, and can set metadata at every "Element Data Block". Also, these "Metadata Set" can be followed by "Control Element".

Blocks of respective items such as video item or audio item will be described with reference to FIG. 7. A block "Item Type" of respective items such as video item or audio item may represent the type of items as described above. If the item type is the picture item, then the block may be set to "05h". If the item type is the audio item, then the block may be set to "06h". If the item type is the AUX data item, then the block may be set to "07h". "Item Word Count" may represent the number of words ranging up to the end of this block (equivalent to "Word Count" of the variable-length block). "Item Header" following the "Item Word Count" may represent the number of "Element Data Block". Here, since the "Item Header" may be formed of 8 bits, the number of "Element Data Block" may fall within a range of from 1 to 255 (0 is invalid). "Element Data Block" following this "Item Header" may be used as the item data area.

The "Element Data Block" may comprise "Element Type", "Element Word Count", "Element Number" and "Element data". The "Element Type" and the "Element Word Count" may represent the type of data and the data quantity of the "Element Data". Also, the "Element Number" may represent the sequential order of the "Element Data Block".

Figure 8:
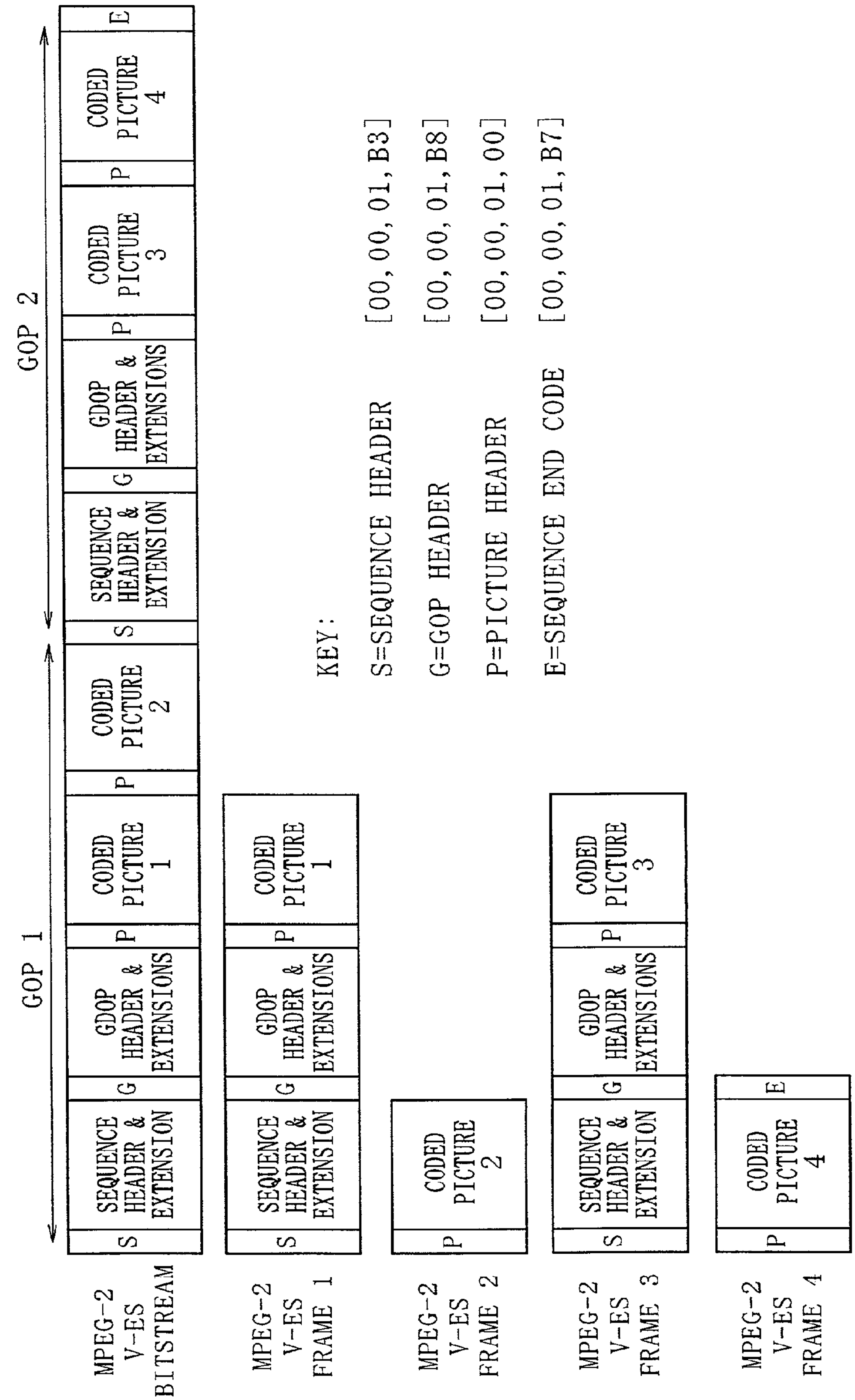
FIG. 8 is a diagram showing a format of an MPEG2 V-ES format in the SDTI-CP element frame.

The arrangement of the "Element Data" will be described next. An MPEG-2 picture element which may be one of the elements may indicate an MPEG-2 video elementary stream (V-ES) of any profile or level. The profile and the level may be defined by a decoder template document. FIG. 8 shows an example of a format of the MPEG-2 V-ES in the SDTI-CP element frame. This example may be an example of V-ES bit stream which may specify a key, i.e. MPEG-2 start code (in accordance with the SMPTE recommended practice). The MPEG-2 V-ES bit stream may be simply formatted to the data block as shown in FIG. 8.

Next, metadata relative to the picture item, e.g. MPEG-2 picture image editing metadata will be described. This metadata may be formed by a combination of editing and error metadata, compression-coded metadata and source-coded metadata. These metadata can be inserted into mainly the above-mentioned system item and can further be inserted into the ancillary data item.

FIG. 9 shows "Picture Editing Bitmap" area, "Picture Coding" area and "MPEG User Bitmap" area provided within the MPEG-2 picture editing metadata that may be inserted into "Picture Metadata Set" of the system item shown in FIG. 4. Further, it is considered that this MPEG-2 picture editing metadata may be provided with "Profile/Level" area representing the profile and the level of the MPEG-2 and video index information defined by the SMPTE186-1995.

Bits b7 and b6 of "Picture Editing Bitmap" of one word may be "Edit flag" and may be a flag indicative of editing point information. This 2-bit flag may indicate the following 4 kinds of the states:

00: No editing point;

01: The editing point may be located ahead of the picture unit with this flag added thereto (Pre-picture edit);

10: The editing point may be located behind the picture unit with this flag added thereto (Post-picture edit);

11: Only one picture unit may be inserted, and the editing point may be located ahead of and behind the picture unit with this flag added thereto (single frame picture).

That is, the flag which may indicate whether or not video data (picture unit) inserted into the picture item may be located ahead of the editing point, whether or not the video data may be located behind the editing point or whether or not the video data may be located between two editing points may be inserted into the "Picture Editing Bitmap" of the "Picture Metadata Set" (see FIG. 4).

Bits b5 and b4 may be "Error flag". This "Error flags" may indicate whether or not the picture may contain an error that cannot be corrected, whether or not the picture may contain a conceal error or whether or not the picture may not contain an error or further whether or not the picture may be placed in the unknown state. A bit b3 may be a flag which may determine whether "Picture Coding" exists within this "Picture Metadata Set" area or not. If this flag is held at "1", then it may indicate that the above area contains "Picture Coding".

A bit b2 may be a flag which may determine whether or not "Profile/Level" is contained in the metadata block. If this flag is held at "1", there may be indicated that the "Metadata Block" contains the "Profile/Level". This "Profile/Level" may indicate MP@ML or HP@HL or the like indicating the profile or the level of MPEG.

A bit b1 may be a flag which may determine whether or not "HV Size" is contained in the metadata block. Here, if this flag is held at "1", there may be determined that "HV Size" is contained in the "Metadata Block". A bit b0 may be a flag which may determine whether or not "MPEG User Bitmap" is contained in the metadata block. Here, if this flag is held at "1", there may be determined that the "Metadata Block" contains the "MPEG User Bitmap".

A bit b7 of "Picture Coding" of one word may contain "Closed GOP". It may be determined by this "Closed GOP" whether or not GOP (Group Of Picture) obtained when MPEG-compressed is Closed GOP.

"Broken Link" may be allocated to a bit b6. This "Broken Link" may be a flag which may be used by the decoder side to control the reproduction. That is, although the respective pictures of MPEG are arranged in the sequential order of B picture, B picture, I picture . . . , there is then the risk that when a different stream is connected to the stream due to the editing point, B picture of the switched stream, for example, will be decoded with reference to P picture of the stream which is not yet switched. If this flag is set, then it is possible to prevent the decoder side from executing the above-mentioned decoding.

"Picture Coding Type" may be assigned to bits b5 to b3. This "Picture Coding Type" may be a flag which may indicate whether the picture is the I picture, the B picture or the P picture. Bits b2 to b0 may be allocated to a reserved area (Reserved).

"History data" may be allocated to a bit b7 of "MPEG User Bitmap" of one word. This "History data" may be a flag which may determine whether or not encoded data such as quantization step, macrotype or motion vector required by the encoding of the previous generation may be inserted into a user data area, existing within "Metadata" of "Metadata Block", for example, as History data. "Anc data" may be allocated to a bit b6. This "Anc data" may be a flag which may determine whether or not data inserted into the ancillary area (e.g. data required by the MPEG compression, etc.) is inserted into the aforementioned user data area as Anc data.

"Video index" may be allocated to a bit b5. This "Video index" may be a flag which may determine whether or not Video index information is inserted into the Video index area. This Video index information may be inserted into a Video index area of 15 bytes. In this case, there may be determined insertion positions at every five classes (respective classes of 1.1, 1.2, 1.3, 1.4 and 1.5). The Video index information of 1.1 class, for example, may be inserted into the first three bytes.

"Picture order" may be allocated to a bit b4. This "Picture order" may be a flag which may determine whether or not the sequential order of the respective pictures of the MPEG stream is changed. Incidentally, the change of the sequential order of the respective pictures of the MPEG stream may become necessary upon multiplexing.

"Timecode2", "Timecode1" may be allocated to bits b3, b2. The "Timecode2", "Timecode1" may be flags which may determine whether or not a VITC (Vertical interval Time Code) and an LTC (longitudinal Time Code) are inserted into the areas of the Timecode2, 1.

"H-Phase", "V-Phase" may be allocated to bits b1, b0. The "H-Phase", "V-Phase" may be flags which may indicate from which horizontal pixel and vertical line information may be encoded, i.e. frame information used in actual practice may exist in the user data area.

Figure 10:
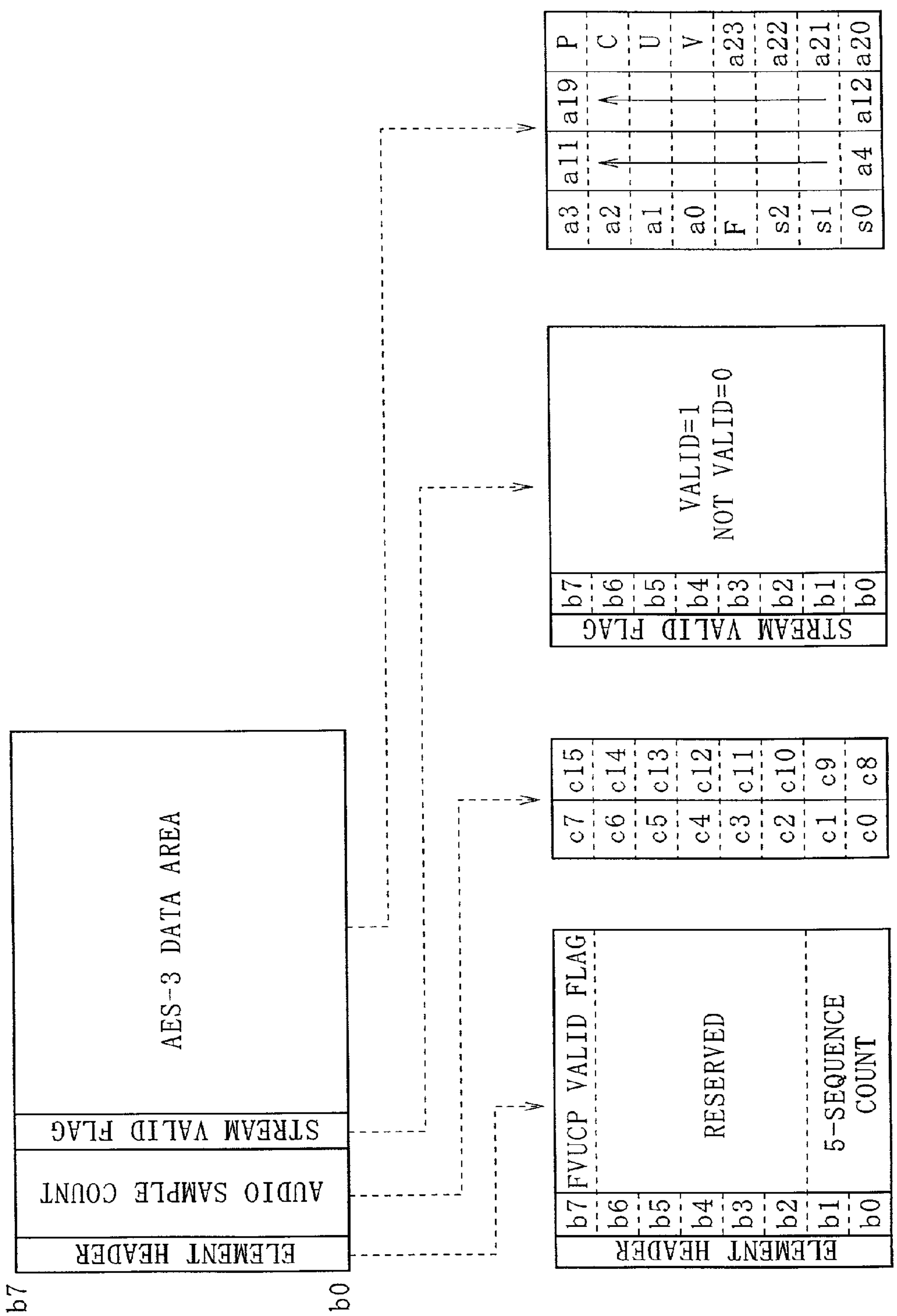
FIG. 10 is a diagram showing an arrangement of an element data block of an audio block.

The audio item will be described next. "Element Data" of the audio item may comprise "Element Header", "Audio Sample Count", "Stream Valid Flags", "Data Area" as shown in FIG. 10.

A bit b7 of "Element Header" of one word may be "FVUCP Valid Flag" which may indicate whether or not FVUCP defined on the AES-3 format standardized by the AES (Audio Engineering Society) is set by audio data (audio data) of the AES-3 format of "Data Area". Bits b6 to b3 may be allocated to a reserved area (Reserved), and bits b2 to b0 may indicate the sequence number of the 5-frame sequence (5-sequence counter).

Here, the 5-frame sequence will be described. When the audio signal synchronized with a video signal of (30/1.001) frame/second in the scanning line in which one frame may comprise 525 lines and whose sampling frequency is 48 kHz is divided into every block of each frame of a video signal, the number of samples per one video frame may become 1601.6 samples and may not become an integral value. Therefore, the sequence in which there are provided two frames of 1601 samples and there are provided three frames of frame of 1602 samples so that 5 frames may provide 8008 samples may be called a 5-frame sequence.

Figures 11A, 11B:
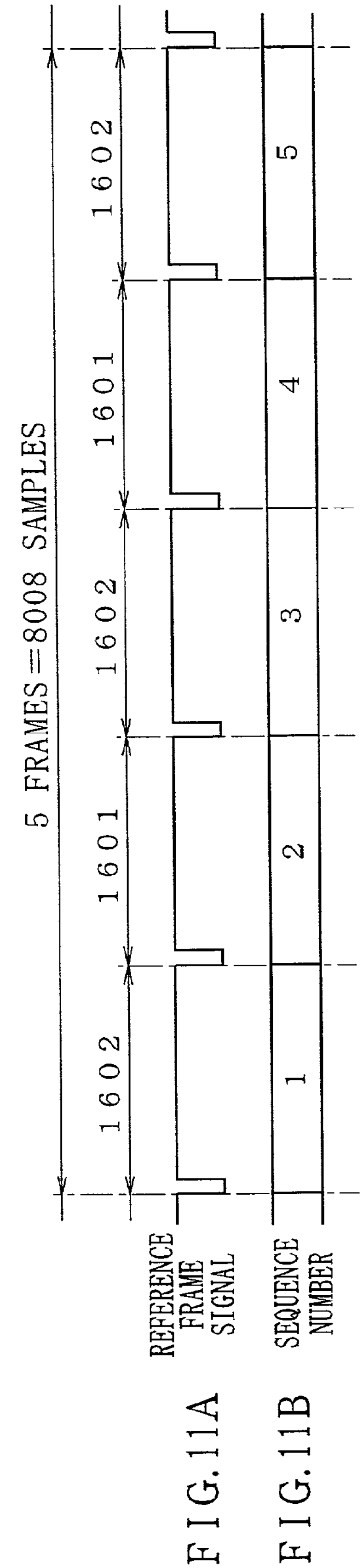
FIGS. 11A and 11B are diagrams to which reference will be made in explaining 5-frame sequence.

In the 5-frame sequence, in synchronism with the reference frame shown in FIG. 11A, the frames of sequence numbers 1, 3, 5 may be set to 1602 samples and the frames of sequence numbers 2, 4 may be set to 1601 samples as shown in FIG. 11B, for example. This sequence number may be indicated by bits b2 to b0.

"Audio Sample Count" of 2 words may be a 16-bit counter within a range of 0 to 65535 by using bits c15 to c0 as shown in FIG. 10, and may indicate the number of samples of each channel. Incidentally, within the element, it may be assumed that all channel have the same value.

"Stream Valid Flags" of one word mat be used to indicate whether or not each stream of 8 channels is valid. If each channel contains meaningful audio data, then a bit corresponding to this channel may be set to "1" and other bits may be set to "0". There may be transmitted only audio data of channel in which a bit may be set to "0".

"s2 to s0" of "Data Area" may be a data area which may be used to discriminate each stream of 8 channels. "F" may indicate the start of the sub-frame. "a23 to a0" may indicate audio data, "P, C, U, V" may indicate channel status, user bit, Validity bit, parity or the like.

Figure 12:
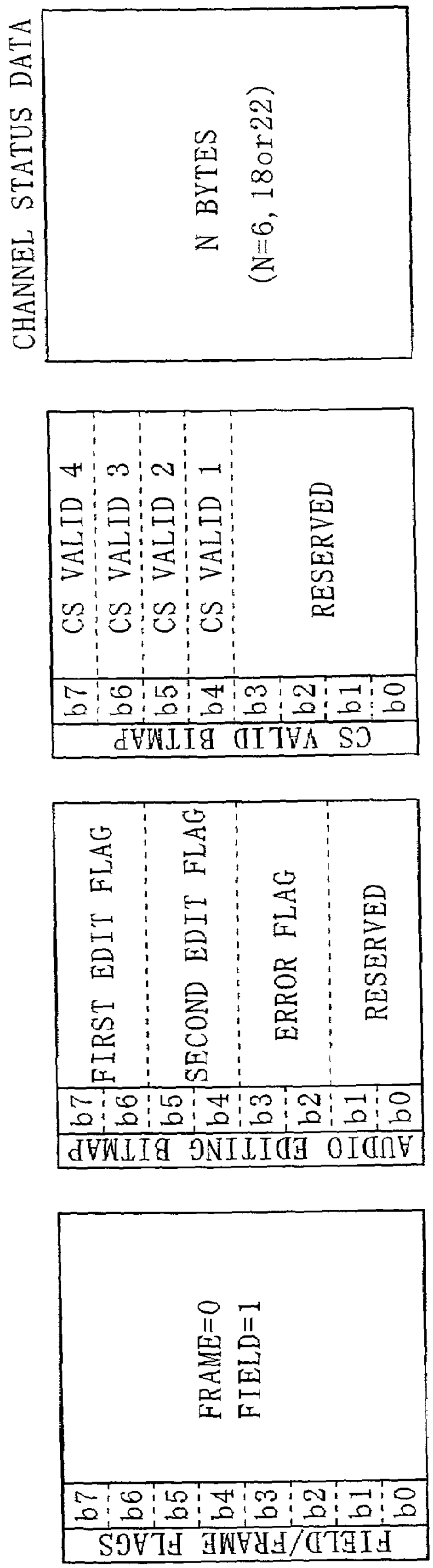
FIG. 12 is a diagram showing an arrangement of audio editing metadata.

Metadata for the audio item will be described next. Audio editing metadata (Audio Editing Metadata) may be formed of a combination of editing metadata, error metadata and source-coding metadata. This audio editing metadata may comprise one-word "Field/Frame flags", one-word "Audio Editing Bitmap", one-word "CS Valid Bitmap" and "Channel Status Data" as shown in FIG. 12.

Here, the number of valid audio channels can be discriminated by the above-mentioned "Stream Valid Flags" of FIG. 10. Also, if the flag of "Stream Valid Flags" is set to "1", then "Audio Editing Bitmap" may become valid.

"First editing flag" of "Audio Editing Bitmap" may indicate information concerning the editing situation of the first field, and "Second editing flag" may indicate information concerning the editing situation of the second field, which may be used to determine whether the editing point is located ahead of or behind the field with this flag attached thereto. "Error flag" may indicate whether or not errors that cannot be corrected occur.

"CS Valid Bitmap" may be used as a header of "Channel Status Data" of n (n=6, 14, 18 or 22) bytes, and may indicate one of 24 channel status words existing within the data block. Here, "CS Valid1" may be a flag which may indicate whether or not data exists in data of 0 to 5 bytes of "Channel Status Data". "CS Valid2" to "CS Valid4" may be flags which may indicate whether or not data exists in a range of from 6 to 13 bytes, 14 to 17 bytes and 18 to 21 bytes of "Channel Status Data".

Incidentally, "Channel Status Data" may be formed of 24-byte data. The 22-byte data at the second from the last may determine whether or not data exist in a range of from 0 to 21 bytes. The last 23-byte data may be assigned to a CRC. Also, a "Filed/Frame flags" flag may indicate whether data may be packed at the frame unit or the field unit for 8-channel audio data.

A general-purpose data format (General Data Format) may be used to transport all free form data types. However, this all free form data type may not contain a special ancillary element type such as IT nature (word processing, hypertext, etc.).

The arrangement of the data transmission apparatus for transmitting data according to such SDTI-CP format will be described next.

Figure 13:
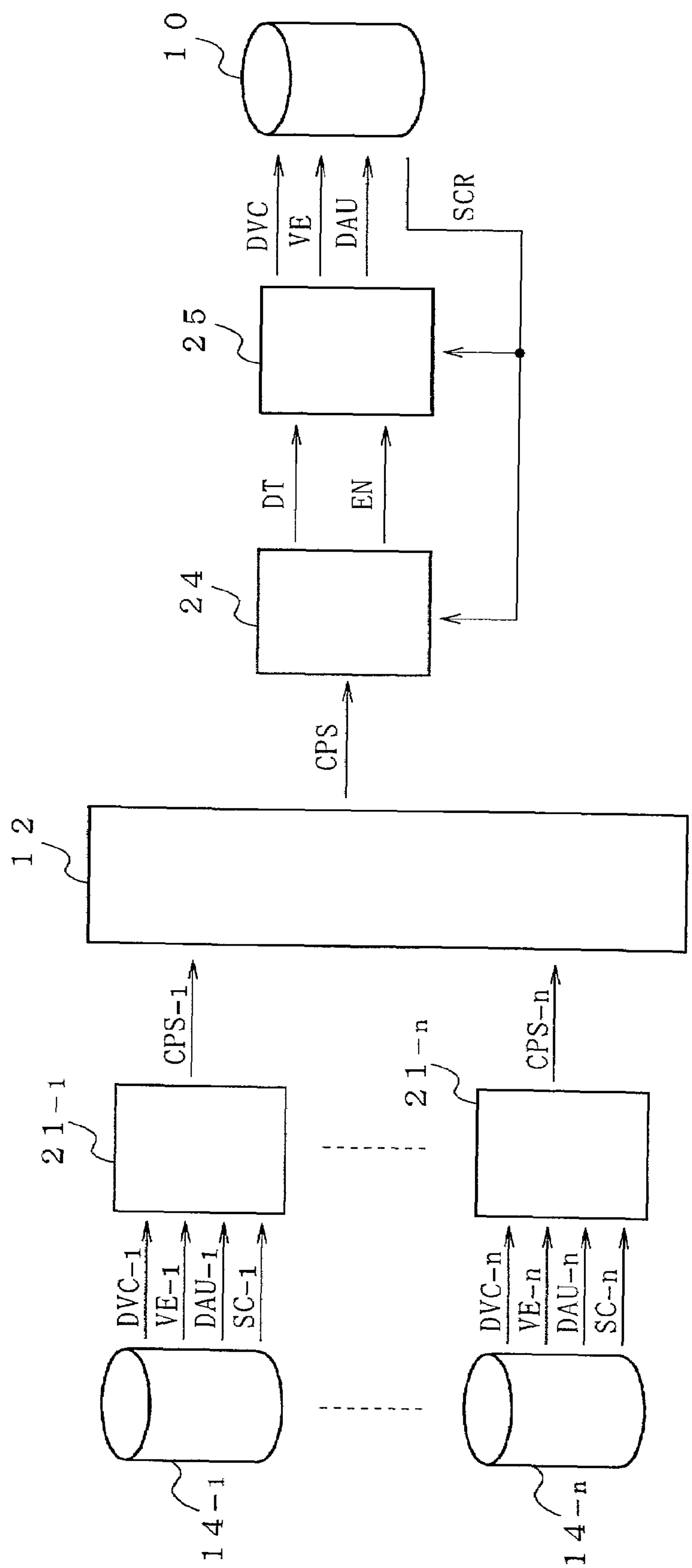
FIG. 13 is a block diagram showing a data transmission system.

As shown in FIG. 13, when video data and audio data of a program and AUX data such as information concerning a program may be transmitted to a data recording and reproducing apparatus 10 such as a server or a video tape recorder, program data from a plurality of data output apparatus 14-1 to 14-*n* can be switched and accumulated in the data recording and reproducing apparatus 10 by using a matrix switcher 12 such as a router (Router). Incidentally, in order to simplify the description, transmitted data may be assumed to be video data and audio data.

When this program data may be transmitted, a stream of video data DVC-1 that was compressed by the MPEG2 system from the data output apparatus 14-1, for example, or audio data DAU-1 that was not compressed may be packed at the frame unit by a CP encoder 21-1, and this data may be converted into serial data CPS-1 and then outputted as data of the aforementioned SDTI-CP format. Incidentally, a signal VE-1 may be an enable signal which may indicate that the video data DVC-1 is valid. A signal SC-1 may be a horizontal or vertical synchronizing signal. Also, in a like manner, data from other data output apparatus 14-*n* may be packed at the frame unit by a corresponding CP-encoders 21-*n* and data may be converted into serial data CPS-n as data of the SDTI-CP format. Incidentally, the respective data output apparatus 14-1 to 14-*n* may be operated with reference to one signal SC.

On the reception side, a CP decoder 24 may decode serial data selected by a matrix switcher 12 to provide packed video data and audio data or the like. Then, video and audio data DT may be supplied to a de-packing section 25. Incidentally, a signal EN may be an enable signal. The de-packing section 25 may de-pack the supplied data DT to provide one frame-compressed video data and non-compressed audio data or the like, which may be supplied to and accumulated in a data recording and reproducing apparatus 10. The CP decoder 24 and the de-packing section 25 may be operated on the basis of a signal SCR supplied from the data recording and reproducing apparatus 10.

Figure 14:
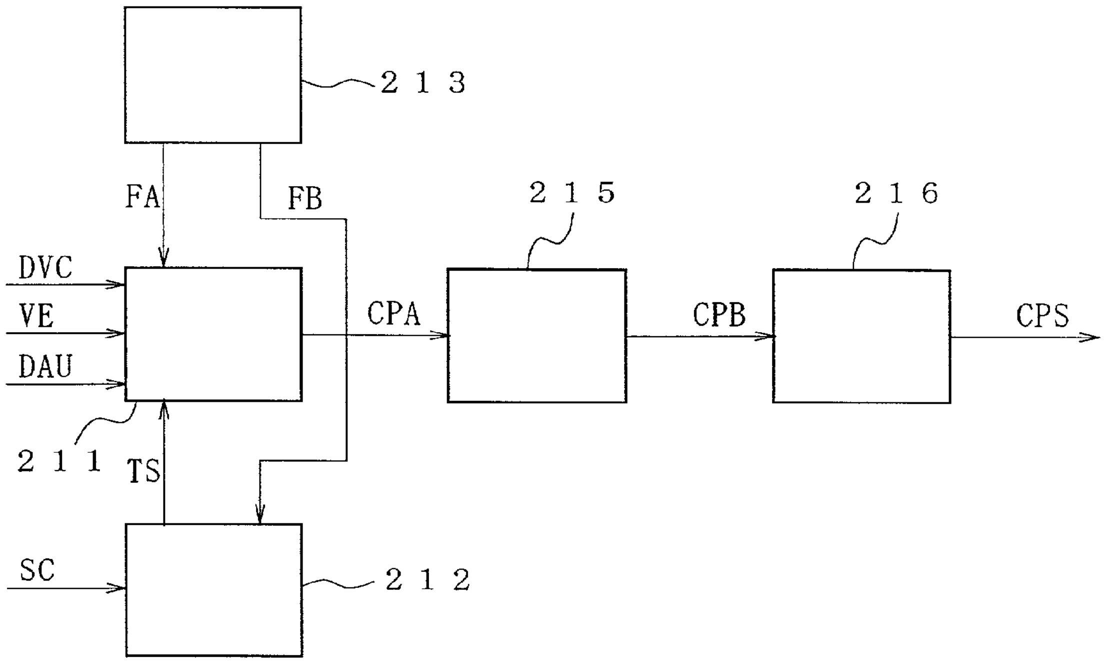
FIG. 14 is a block diagram showing a CP encoder.

FIG. 14 shows the arrangement of the CP encoder 21. FIG. 15 shows operations of the respective sections of the CP encoder 21. A stream of compressed video data DVC shown in FIG. 15A and a stream of audio data DAU shown in FIG. 15B, each of which was supplied from the data output apparatus 14, may be supplied to an SDTI-CP format section 211, comprising a data insertion means, of the CP encoder 21. Also, the signal SC may be supplied to a timing signal generating section 212. Incidentally, the data insertion means may comprise the SDTI-CP format section 211, the timing signal generating section 212 and a CPU 213 which will be described later on.

The CPU (Central Processing Unit) 213 may be connected to the SDTI-CP format section 211 and the timing signal generating section 212. The CPU 213 may supply a signal FA indicative of a variety of information of system item, header information of picture item, header information of audio item or the like to the SDTI-CP format section 211. With respect to the audio item, for example, there may be supplied the signal FA which may indicate information such as the sequence number of the 5-frame sequence and the number of audio samples in the frame.

Also, the CPU 213 may supply a signal FB indicative of a data quantity of system item and a data quantity of header information such as picture item to the timing signal generating section 212.

The timing signal generating section 212 may generate a timing signal TS on the basis of the signal SC and the signal FB indicative of the data quantity, and may supply the timing signal to the SDTI-CP format section 211.

The SDTI-CP format section 211 may generate the stream of the video data DVC and the stream of the audio data DAU on the basis of the timing signal TS, and may generate packaged data CPA of each item by adjusting a timing as shown in FIG. 15A on the basis of a variety of information of the system item, the header information of the picture item and the header information of the audio item. For example, the format section may generate the stream of the video data and the stream of the audio data in such a manner that the system item may become the payload area of the line number 13 and also may generate the packaged data on the basis of the header information such as the data quantity of the system item and the picture item by adjusting a timing of each picture item and audio item following the system item. The thus generated packaged data CPA of each item may be supplied to an SDTI format section 215 comprising a data output means. Incidentally, the data output means may comprise the SDTI format section 215 and an SDTI format section 216 which will be described later on.

The SDTI format section 215 may generate an SDTI stream CPB of a variable-length block arrangement by adding data of "Separator", "Item Type", "Word Count", "End Code" to the packaged data of each item. This SDTI stream CPB may be supplied to the SDI format section 216.

The SDT format section 216 may generate an SDI stream CPC shown in FIG. 15E by adding data such as the EAV and the SAV and header information such as the line number to the supplied SDTI stream CPB. This SDI stream CPC may be converted into serial data CPS and then outputted.

Also, the CP decoder 24 on the reception side may decode the serial data CPS in a manner opposite to that of the CP encoder 21 to provide packaged video data, audio data or the like. Further, a de-packing section 25 may output the separated video data and audio data at a speed corresponding to the data recording and reproducing apparatus so that a program outputted from the data output apparatus can be recorded on the data recording and reproducing apparatus 10.

A program transmitting operation will be described next with reference to FIG. 16. Incidentally, it is assumed that the transmission side and the reception side may be operated in synchronism with a reference signal SCM shown in FIG. 16A. At a time t1, the data output apparatus 14 may output data V1 of one frame amount of compressed video data DVC shown in FIG. 16B. The enable signal VE which may indicate that the video data DVC is valid may be held at low level "L" during a period in which the video data DVC is valid as shown in FIG. 16C. Also, the non-compressed audio data DAU may be outputted from the data output apparatus 14 as shown in FIG. 16D. Audio data of one frame period from the time t1 may be assumed to be data A1.

When the output of one frame amount of video data is completed at a time t2, the signal level of the enable signal VE may be held at the high level "H".

At a time t3 after one frame period elapsed since the time t1, data V2 of the next one frame amount may be outputted from the data output apparatus 14, and audio data of one frame period from the time t3 may be assumed to be data A2.

The CP encoder 21 may pack the data V1, A1 supplied during one frame period ranging from the time t1 to the time t3 to the SDTI-CP format, may convert the same into serial data CPS shown in FIG. 16E, and may transmit the same during one frame period from the time t3.

The CP decoder 24 on the reception side may decode the received serial data CPS to provide the packed video data and audio data, and may supply the video and audio data DT to the de-packing section 25 as shown in FIG. 16F. Incidentally, a signal EN shown in FIG. 16G may be an enable signal whose signal level may be held at low level "L" during a period in which the data DT is valid, e.g. during a period ranging from a time t4 to a time t5.

The de-packing section 25 may de-pack the supplied data DT to provide compressed video data of one frame and non-compressed audio data or the like, may supply, at a time t6 which may be the trailing edge of the next frame pulse, the video data DVC and the audio data DAU to the data recording and reproducing apparatus 10, in which they can be accumulated as shown in FIGS. 16H and 16K. Incidentally, FIG. 16J shows an enable signal VE which may indicate a period during which the video data DVC shown in FIG. 16H is valid.

Figures 17A, 17B, 17C, 17D, 17E, 17F, 17G:
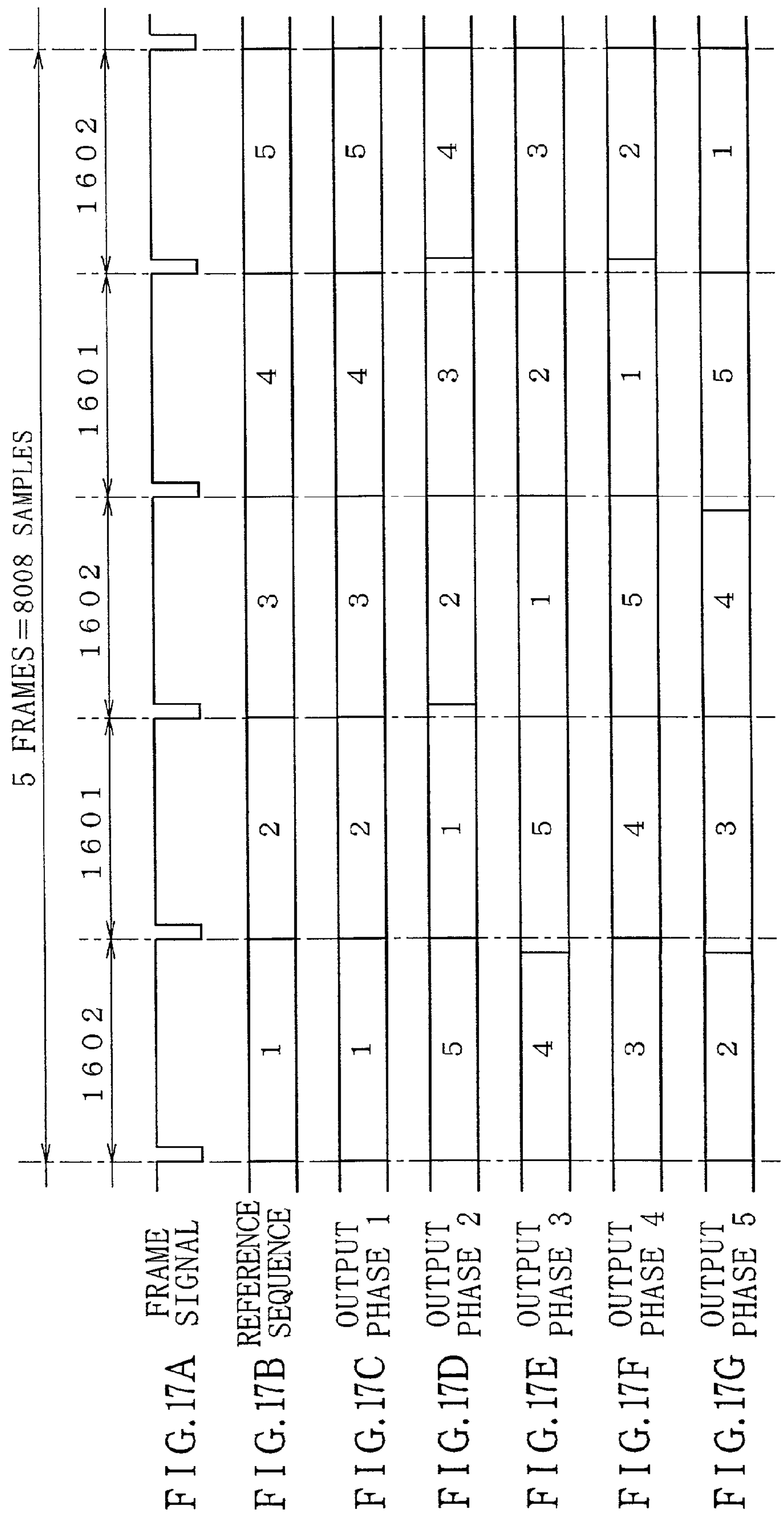
FIGS. 17A to 17G are diagrams to which reference will be made in explaining an output phase of 5-frame sequence.

When this audio data is outputted, the de-packing section 25 may generate a reference sequence on the basis of the signal SCR from the data recording and reproducing apparatus 10 to thereby prescribe the number of samples of each frame, and then may output audio data of the prescribed number of samples. Therefore, when the audio data of the 5-frame sequence is outputted, if the audio data has five output phases relative to the reference sequence shown in FIG. 17B, i.e. the sequence number of the reference sequence is "1," then the sequence number of the audio data will become "1" to "5" as shown in FIGS. 17C to 17G. Incidentally, FIG. 17A shows a frame signal.

Figure 18:
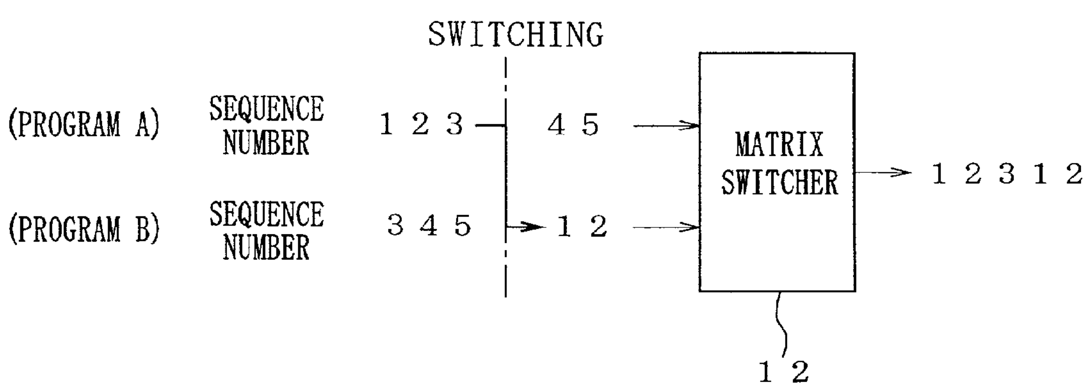
FIG. 18 is a diagram to which reference will be made in explaining an operation executed when a program is switched.
Figures 19A, 19B, 19C, 19D:
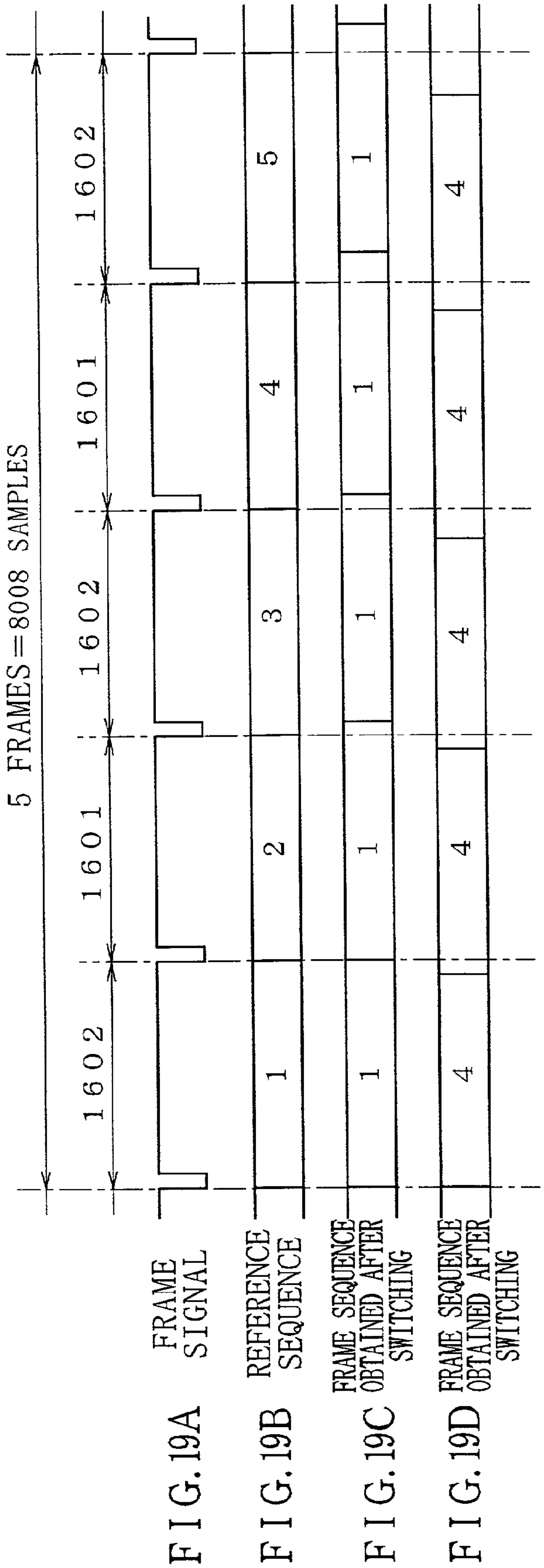
FIGS. 19A to 19D are diagrams to which reference will be made in explaining the phase shift of audio data.

Here, when audio data of a program A of a 5-frame sequence is switched to audio data of a program B by the matrix switcher 12 as shown in FIG. 18, the sequence numbers of audio data will become sometimes discontinuous. For example, when the program A is switched to the program B at the last of the sequence number 3, the sequence number becomes "1" so that the sequence numbers may become discontinuous. When the program is switched as described above, the sequence numbers may become discontinuous. Thus, if the sequence of 1602 samples increases, then the phase of audio data will be delayed. For example, when the reference sequence is the reference sequence 1, the program of the output phase 1 may be selected. When the reference sequence is the reference sequence 2, the program of the output phase 2 may be selected. Further, when the reference sequence is the reference sequence 3, the program of the output phase 3 may be selected. When the reference sequence is the reference sequence 4, the program of the output phase 4 may be selected. Thus, the sequence having 1602 samples can be selected continuously. Here, since the frame in which the reference sequences are the sequence numbers 2, 4 has 1601 samples, the phase of the audio data may be delayed from the reference sequence shown in FIG. 19B as shown in FIG. 19C. Also, when the programs with the sequence numbers having 1601 samples are sequentially switched and selected, the phase of audio data may be advanced as shown in FIG. 19D. Incidentally, FIG. 19A shows a frame signal.

For this reason, on the basis of the sequence number of the reference sequence and the count value of "5-sequence count" of "Element Header" of the audio item, the output timing of audio data may be adjusted in such a manner as to provide the phase shown in FIG. 17 at every frame.

Here, when the number of samples increases due to the switching of the program, if the program with the sequence number 1 of the reference sequence and the output phase 2 is switched to the program with the sequence number 2 of the reference sequence and the output phase 3, then the output timing can be adjusted by advancing the data of the program with the output phase 3 by one sample. Alternatively, the output timing can be adjusted by starting the output of data from the second sample of the data of the program with the output phase 3.

When the number of samples decreases due to the switching of the program, if the program with the sequence number 2 of the reference sequence and the output phase 1 is switched to the program with the sequence number 3 of the reference sequence and the output phase 2, then the output timing may be adjusted by a conceal processing for concealing insufficient data, whereby the phase of audio data can be made correct.

As described above, since the audio item has the count value of "5-sequence count", i.e. information of the sequence number, if the output timing of the audio data is adjusted on the basis of this sequence number and the sequence number of the reference sequence, then even when the program is switched repeatedly, the phase of the audio data can be held in the correct state.

Since the audio item includes not only information of "5-sequence count" but also information of "Audio Sample Count", without including information of a video frame frequency as header information of audio data, it is possible to easily discriminate on the basis of these information the packed audio data from data of video frame frequency.

A table 1 shows a relationship among the sequence number represented by "5-sequence count", a sample count value represented by "Audio Sample Count" and a video frame frequency. For example, when the sequence numbers are 1, 3, 5 and the sample count value is 1602 and when the sequence numbers are 2, 4 and the sample count value is 1601, it can be determined that the video frame frequency is (30/1.001) frames/second. Also, when the sequence numbers are 1, 2, 4, 5 and the sample count value is 801 and when the sequence number is 3 and the sample count value is 800, it can be determined that the video frame frequency is (60/1.001) frames/second. Also, when the sequence number is 0 and the sample count value is 1920, it can be determined that the video frame frequency is 25 frames/second. When the sample count value is 960, it can be determined that the video frame frequency is 50 frames/second. When the sample count value is 1600, it can be determined that the video frame frequency is 30 frames/second. When the sample count value is 800, it can be determined that the video frame frequency is 60 frames/second. When the sample count value is 2002, it can be determined that the video frame frequency is (24/1.001) frames/second which may be a frequency corresponding to a movie. When the sample count value is 2000, it can be determined that the video frame frequency is 24 frames/second.

TABLE 1

| 5-SEQUENCE COUNT | AUDIO SAMPLE COUNT | VIDEO FRAME FREQUENCY (FRAME/SEC) |
|---|---|---|
| 1, 3, 5 | 1602 | 30/1.001 |
| 2, 4 | 1601 | |
| 1, 2, 4, 5 | 801 | 60/1.001 |
| 3 | 800 | |
| 0 | 1600 | 30 |
| 0 | 800 | 60 |
| 0 | 1920 | 25 |
| 0 | 960 | 50 |
| 0 | 2002 | 24/1.001 |
| 0 | 2000 | 24 |

As described above, since it can be discriminated on the basis of information of "5-sequence count" and "Audio Sample Count" which video frequency the audio data is based on. When only the data of audio item, for example, is processed, without including information of the video frame frequency as the header information of audio data, the reference sequence for outputting audio data can be generated on the basis of this discriminated result, thereby making it possible to correctly output the audio data.

Incidentally, while the data is assembled into packets at the frame unit as described above, the present invention is not limited thereto, and data may be packaged at the picture unit like I picture, B picture or P picture in the MPEG system.

INDUSTRIAL APPLICABILITY

As described above, the data transmission method and the data transmission apparatus according to the present invention is useful for transmitting data such as a material of a program, and is particularly suitable when data such as a material of a program may be accumulated from the data output apparatus such as a video tape recorder to the data recording and reproducing apparatus such as a server.

What is claimed is:

1. A data transmission method for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted, said data transmission method comprising the steps of:

a first step of generating said transmission packet by inserting reference frame sequence data into said payload area, said reference frame sequence data inserted into a header area of said payload area corresponding to an audio data block area into which said audio data is inserted, wherein said reference frame sequence data is used to manage and adjust the output timing of said audio data so that continuity can be maintained in said audio data even when rapid switching among programs is occurring; and a second step of transmitting said transmission packet into which said reference frame sequence data was inserted at said first step in the form of serial data.

2. A data transmission method as claimed in claim 1, wherein said first step generates said transmission packet by packaging said audio data block area into which said audio data is inserted and said header area as one package.

3. A data transmission method for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted, said data transmission method comprising the steps of:

a first step of generating said transmission packet by inserting reference frame sequence data into said payload area, said reference frame sequence data inserted into a header area of said payload area corresponding to an audio data block area into which said audio data is inserted, and by inserting data indicative of the number of audio samples contained in a frame indicated by said reference frame sequence data into an audio sample count area corresponding to said audio data block area, wherein said reference frame sequence data is used to manage and adjust the output timing of said audio data so that continuity can be maintained in said audio data even when rapid switching among programs is occurring; and a second step of transmitting said transmission packet into which said reference frame sequence data and said data indicative of the number of said audio samples were inserted at said first step in the form of serial data.

4. A data transmission method as claimed in claim 3, wherein said first step generates said transmission packet by packaging said audio data block area into which said audio data is inserted and said header area as one package.

5. A data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted, said data transmission apparatus comprising:

data insertion means for inserting reference frame sequence data into said payload area, said reference frame sequence data inserted into a header area of said payload area corresponding to an audio data block area into which said audio data is inserted, wherein said reference frame sequence data is used to manage and adjust the output timing of said audio data so that continuity can be maintained in said audio data even when rapid switching among programs is occurring; and data output means for outputting said transmission packet into which said reference frame sequence data was inserted by said data insertion means in the form of serial data.

6. A data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which data containing video data and/or audio data is inserted, said data transmission apparatus comprising:

data insertion means for inserting reference frame sequence data into said payload area, said reference frame sequence data inserted into a header area of said payload area corresponding to an audio data block area into which said audio data is inserted, and for inserting data indicative of the number of audio samples contained in a frame indicated by said reference frame sequence data into an audio sample count area corresponding to said audio data block area, wherein said reference frame sequence data is used to manage and adjust the output timing of said audio data so that continuity can be maintained in said audio data even when rapid switching among programs is occurring; and data output means for outputting said transmission packet into which said reference frame sequence data and said data indicative of the number of audio samples were inserted by said data insertion means in the form of serial data.

* * * * *